US011853074B2

(12) United States Patent
Oba

(10) Patent No.: US 11,853,074 B2
(45) Date of Patent: Dec. 26, 2023

(54) CONTROL DEVICE AND CONTROL SYSTEM

(71) Applicant: Sony Semiconductor Solutions Corporation, Kanagawa (JP)

(72) Inventor: Eiji Oba, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 313 days.

(21) Appl. No.: 16/638,282

(22) PCT Filed: Aug. 14, 2018

(86) PCT No.: PCT/JP2018/030300
§ 371 (c)(1),
(2) Date: Feb. 11, 2020

(87) PCT Pub. No.: WO2019/035458
PCT Pub. Date: Feb. 21, 2019

(65) Prior Publication Data
US 2020/0183411 A1 Jun. 11, 2020

(30) Foreign Application Priority Data
Aug. 18, 2017 (JP) .................................. 2017-157865

(51) Int. Cl.
*G05D 1/02* (2020.01)
*B60R 11/04* (2006.01)
(Continued)

(52) U.S. Cl.
CPC ............ *G05D 1/0246* (2013.01); *B60R 11/04* (2013.01); *G06V 20/588* (2022.01);
(Continued)

(58) Field of Classification Search
CPC ......... G05D 1/0246; G05D 2201/0212; G05D 2201/0213; G05D 1/0251; G05D 1/0077;
(Continued)

(56) References Cited

U.S. PATENT DOCUMENTS 9,150,220 B2 * 10/2015 Clarke .............. B60W 30/0953
2005/0273264 A1 12/2005 Gern et al.
(Continued)

FOREIGN PATENT DOCUMENTS

| CN | 102439644 A | 5/2012 |
|---|---|---|
| CN | 105313895 A | 2/2016 |

(Continued)

OTHER PUBLICATIONS

U.S. Appl. No. 16/631,020, filed Jan. 14, 2020, Oba.
(Continued)

*Primary Examiner* — Jeff A Burke
*Assistant Examiner* — Sihar A Karwan
(74) *Attorney, Agent, or Firm* — Wolf, Greenfield & Sacks, P.C.

(57) ABSTRACT

There is provided a control device including: a control unit that performs driving control of a vehicle. The control unit temporarily continues automated traveling of the vehicle on a basis of a surrounding environment estimated by a remaining function of a compound eye camera, in a case where a malfunction of the compound eye camera used in recognition of the surrounding environment is detected during execution of automated driving control for the vehicle.

17 Claims, 9 Drawing Sheets

(51) Int. Cl.
*H04N 17/00* (2006.01)
*G06V 20/56* (2022.01)
*H04N 13/239* (2018.01)

(52) U.S. Cl.
CPC ... *H04N 17/002* (2013.01); *G05D 2201/0212* (2013.01); *G05D 2201/0213* (2013.01); *H04N 13/239* (2018.05)

(58) Field of Classification Search
CPC .... B60R 11/04; G06V 20/588; H04N 17/002; H04N 13/239; B60W 2050/143; B60W 30/12; B60W 30/165; B60W 50/14; B60W 60/0018; B60W 2050/0215; B60W 2050/0292; G01S 17/931; B60K 28/10
See application file for complete search history.

(56) References Cited

U.S. PATENT DOCUMENTS

| | | | |
|---|---|---|---|
| 2006/0034487 A1* | 2/2006 | Franz | H04N 13/239 348/E13.016 |
| 2009/0209829 A1 | 8/2009 | Yanagidaira et al. | |
| 2014/0018993 A1 | 1/2014 | Kindo et al. | |
| 2015/0073673 A1 | 3/2015 | Hata et al. | |
| 2016/0033964 A1 | 2/2016 | Sato et al. | |
| 2016/0090100 A1* | 3/2016 | Oyama | B62D 15/025 701/23 |
| 2016/0355190 A1 | 12/2016 | Omi | |
| 2017/0075349 A1 | 3/2017 | Sato et al. | |
| 2017/0115662 A1 | 4/2017 | Mori et al. | |
| 2017/0364070 A1 | 12/2017 | Oba | |
| 2018/0075747 A1 | 3/2018 | Pahwa | |
| 2018/0194364 A1* | 7/2018 | Asakura | G05D 1/0061 |
| 2018/0208211 A1 | 7/2018 | Chiba | |
| 2018/0365859 A1* | 12/2018 | Oba | H04N 23/90 |
| 2020/0139992 A1 | 5/2020 | Oba | |
| 2020/0317213 A1 | 10/2020 | Oba et al. | |

FOREIGN PATENT DOCUMENTS

| | | | | |
|---|---|---|---|---|
| CN | 105956548 A | 9/2016 | | |
| CN | 105980228 A | 9/2016 | | |
| CN | 106232443 A | 12/2016 | | |
| EP | 1 958 842 A | 8/2008 | | |
| EP | 3 340 205 A1 | 6/2018 | | |
| EP | 3340205 A1 * | 6/2018 | ............ | B60R 21/00 |
| JP | 2001-206099 A | 7/2001 | | |
| JP | 2005-092285 A | 4/2005 | | |
| JP | 2005-149201 A | 6/2005 | | |
| JP | 2009-193353 A | 8/2009 | | |
| JP | 2010-072800 A | 4/2010 | | |
| JP | 2013-039891 A | 2/2013 | | |
| JP | 2015-162005 A | 9/2015 | | |
| JP | 2016-038793 A | 3/2016 | | |
| JP | 2016-115023 A | 6/2016 | | |
| JP | 2016-115356 A | 6/2016 | | |
| JP | 2016-200931 A | 12/2016 | | |
| JP | 2017-123054 A | 7/2017 | | |
| WO | WO 2016/092796 A1 | 6/2016 | | |
| WO | WO 2017/010264 A1 | 1/2017 | | |
| WO | WO 2017/014093 A1 | 1/2017 | | |
| WO | WO 2017/029847 A1 | 2/2017 | | |

OTHER PUBLICATIONS

International Search Report and Written Opinion and English translation thereof dated Oct. 2, 2018 in connection with International Application No. PCT/JP2018/025655.
International Preliminary Report on Patentability and English translation thereof dated Jan. 30, 2020 in connection with International Application No. PCT/JP2018/025655.
International Preliminary Report on Patentability dated Feb. 27, 2020 in connection with International Application No. PCT/JP2018/030300.
Extended European Search Report dated Sep. 21, 2020 in connection with European Application No. 18834796.7.
International Search Report and Written Opinion dated Nov. 27, 2018 in connection with International Application No. PCT/JP2018/030300.

* cited by examiner

[Fig. 1]
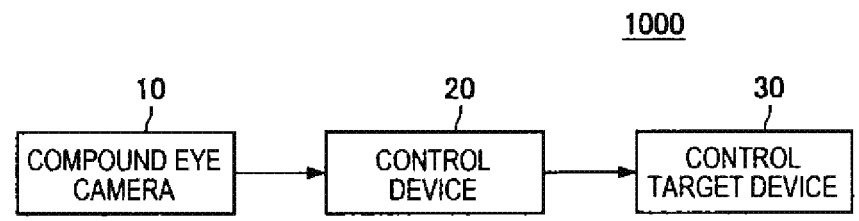
[Fig. 2]
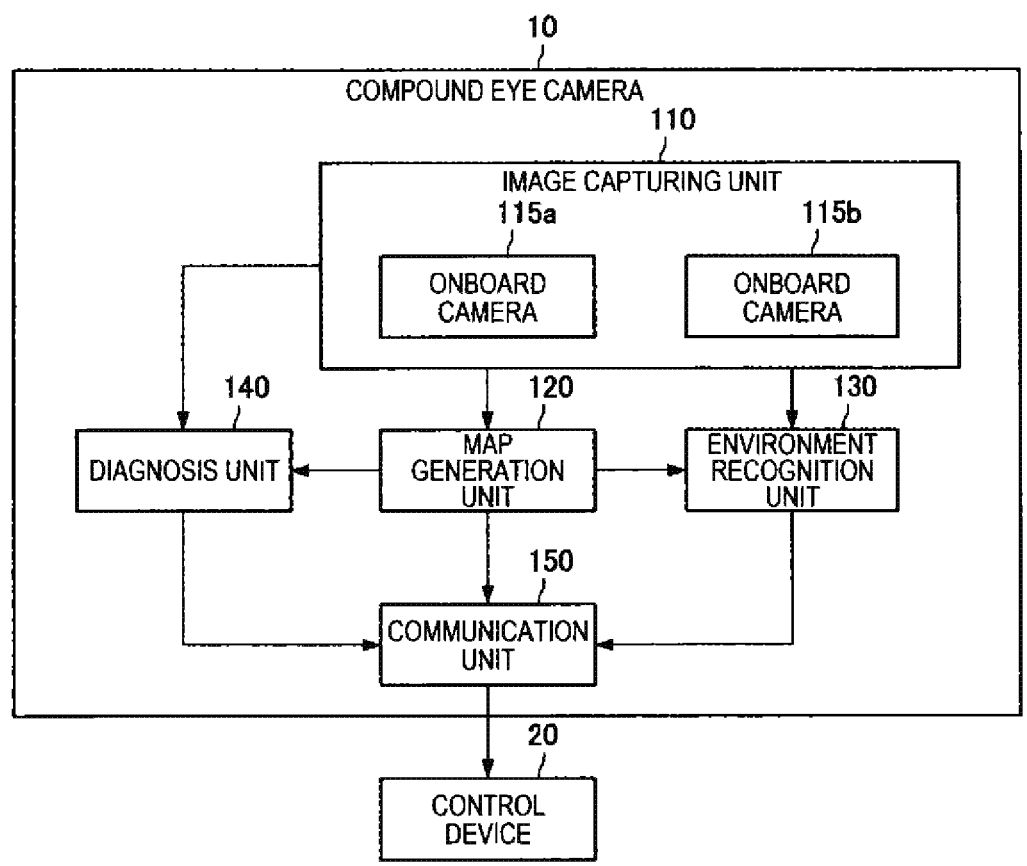

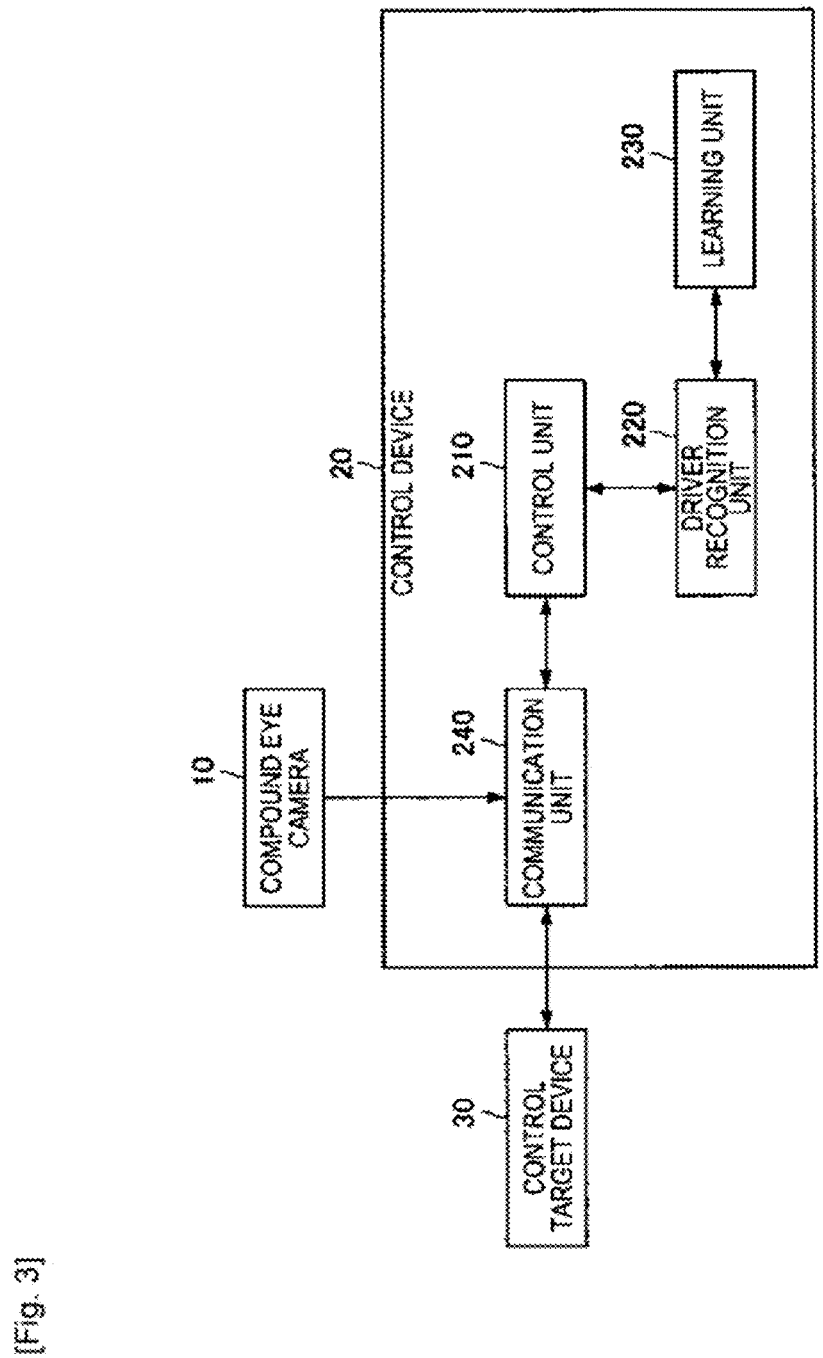
[Fig. 3]

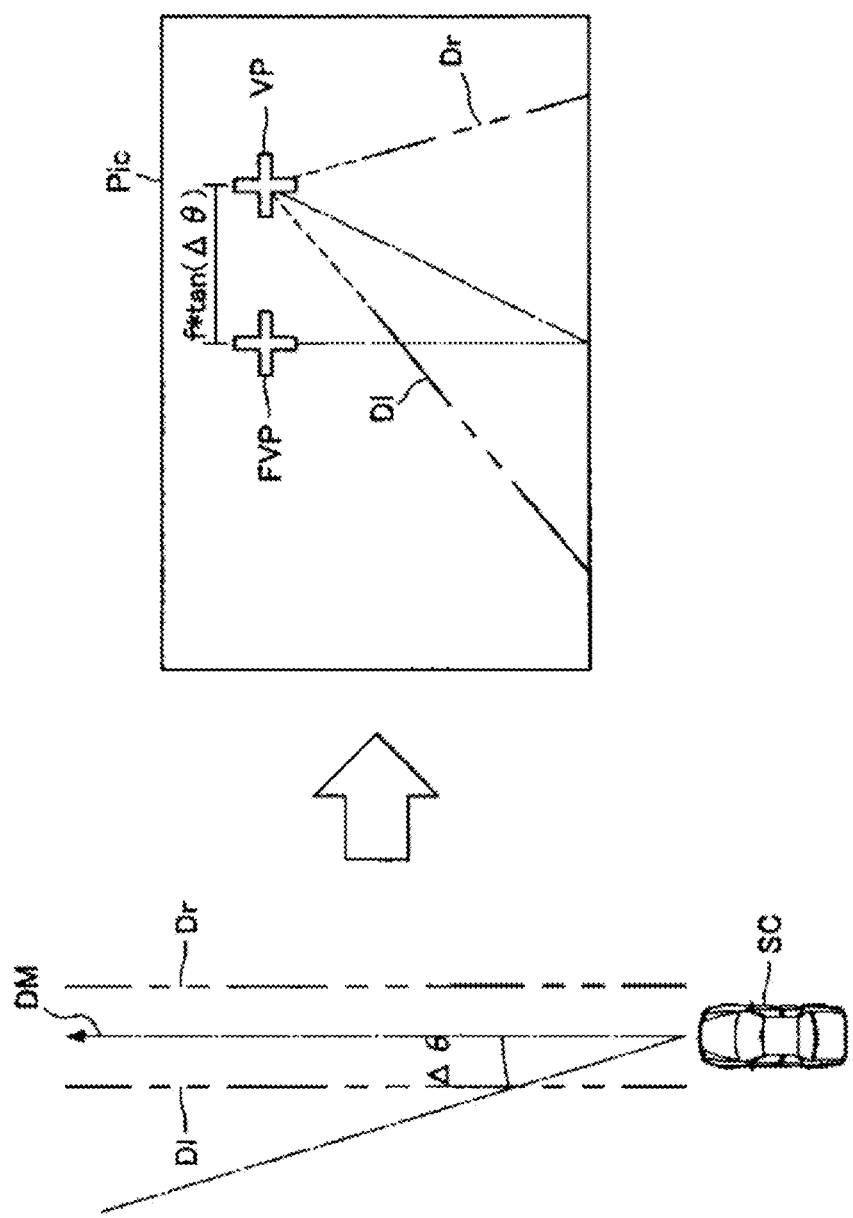

[Fig. 5]
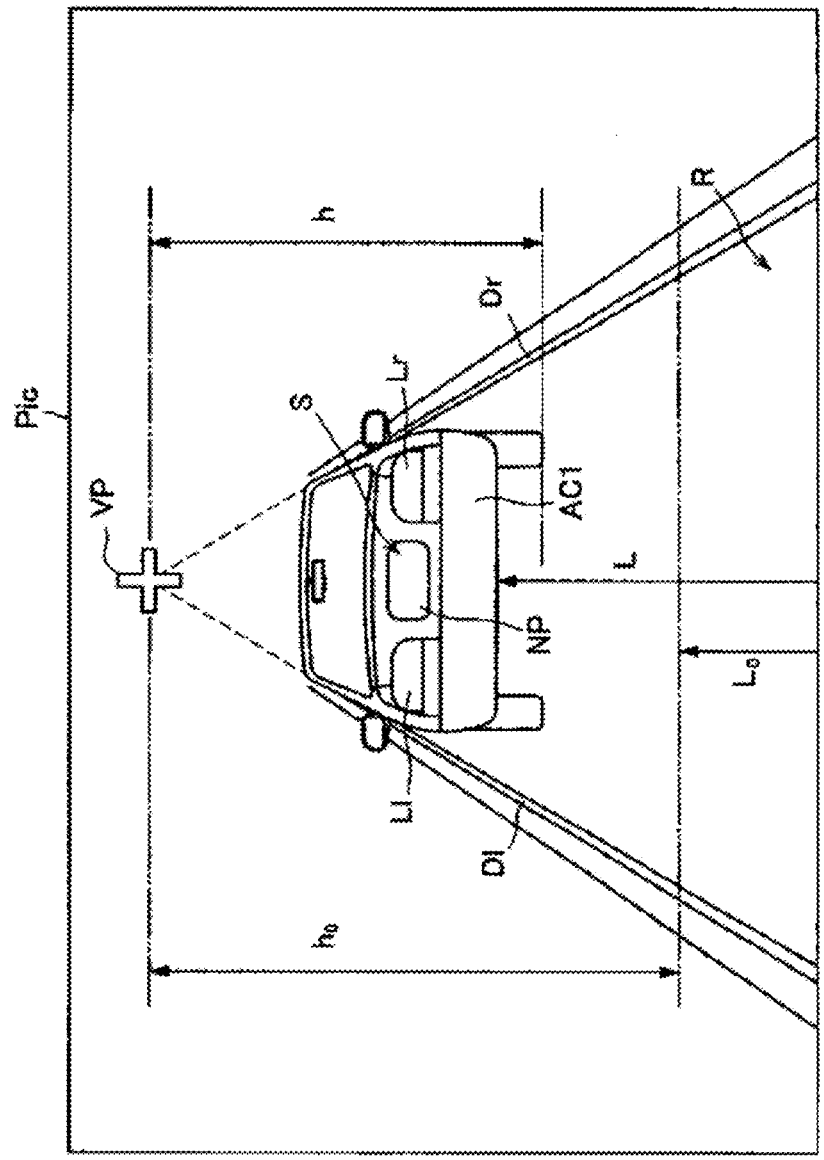

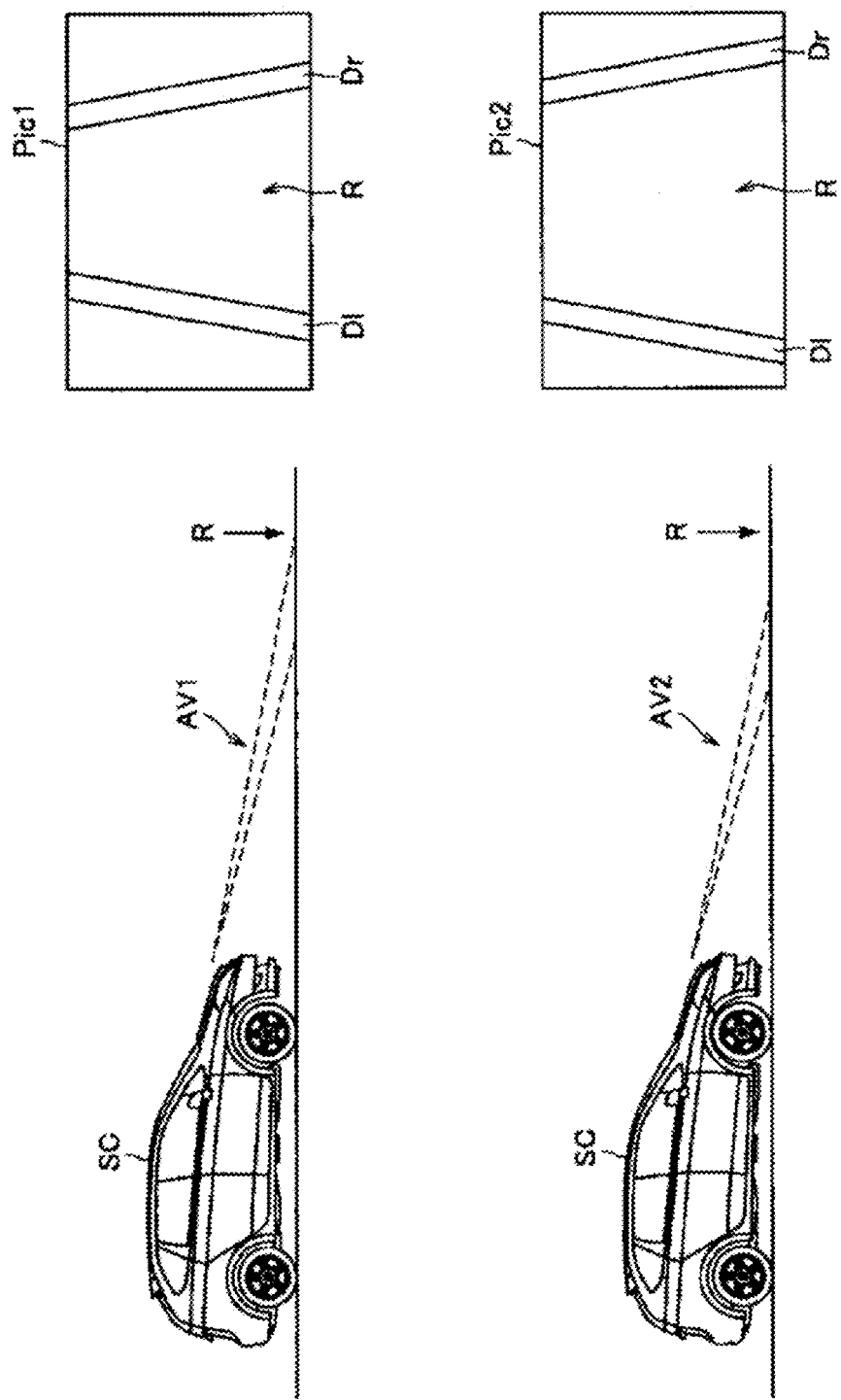

[Fig. 7]
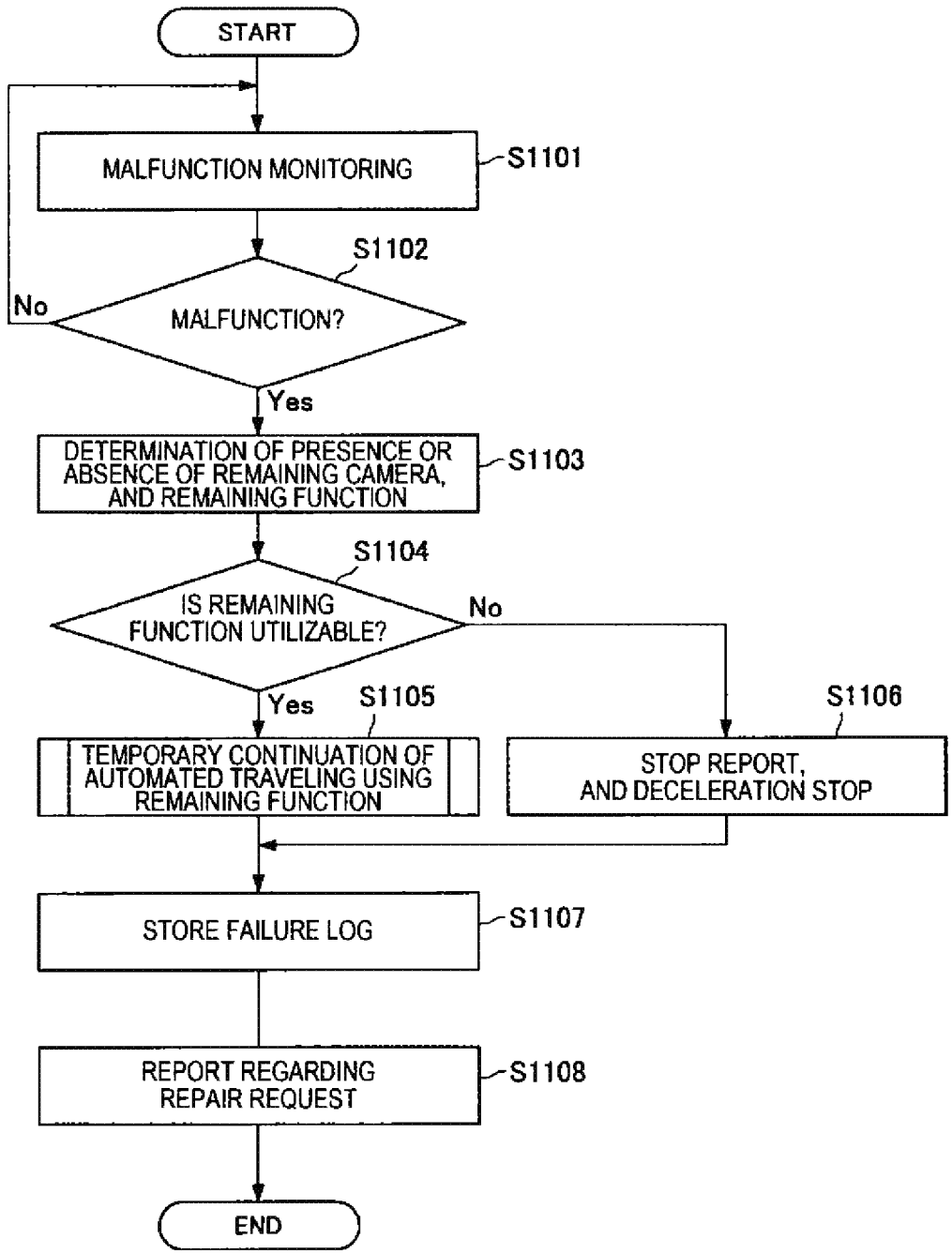

[Fig. 8]
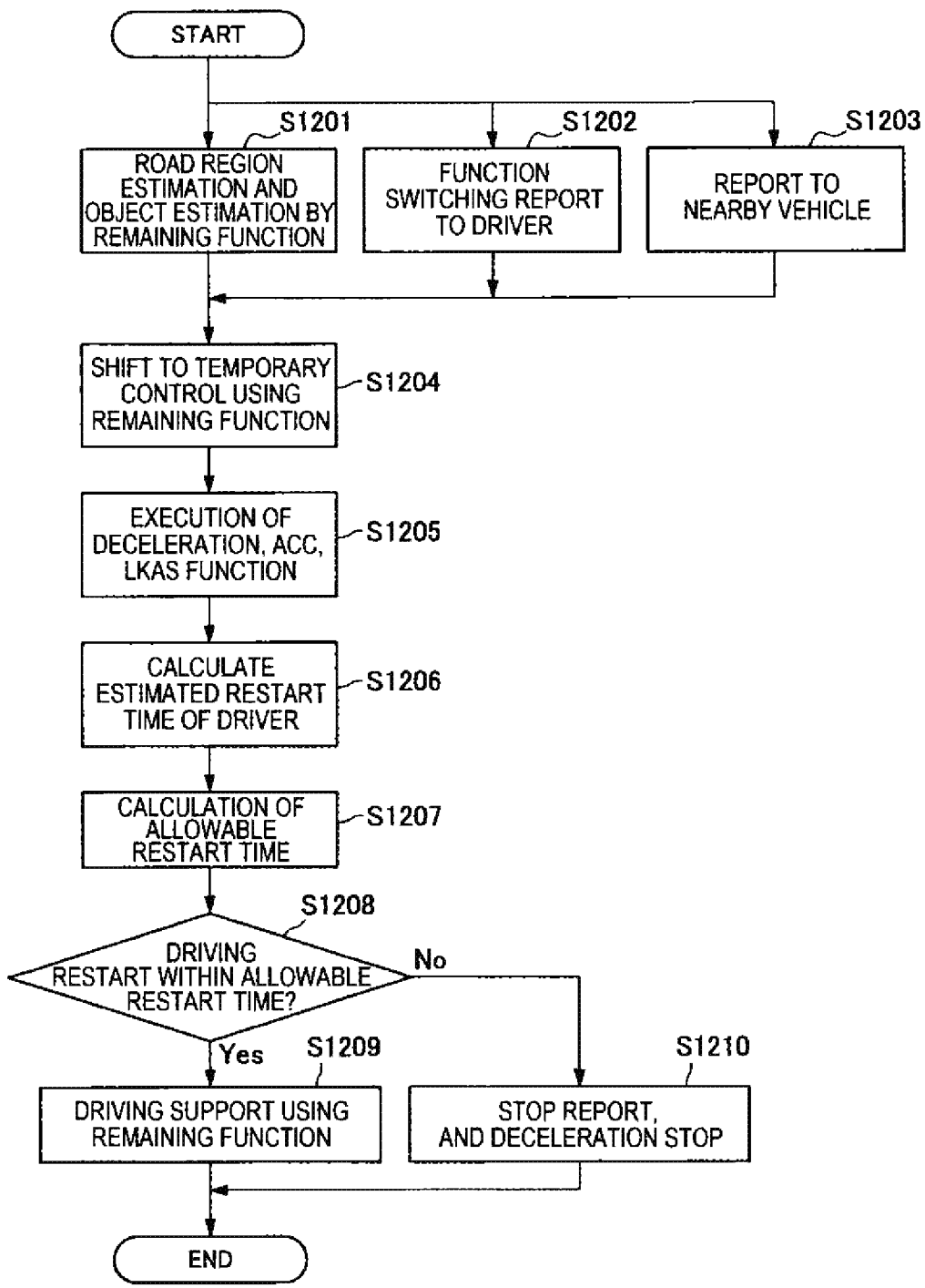

[Fig. 9]
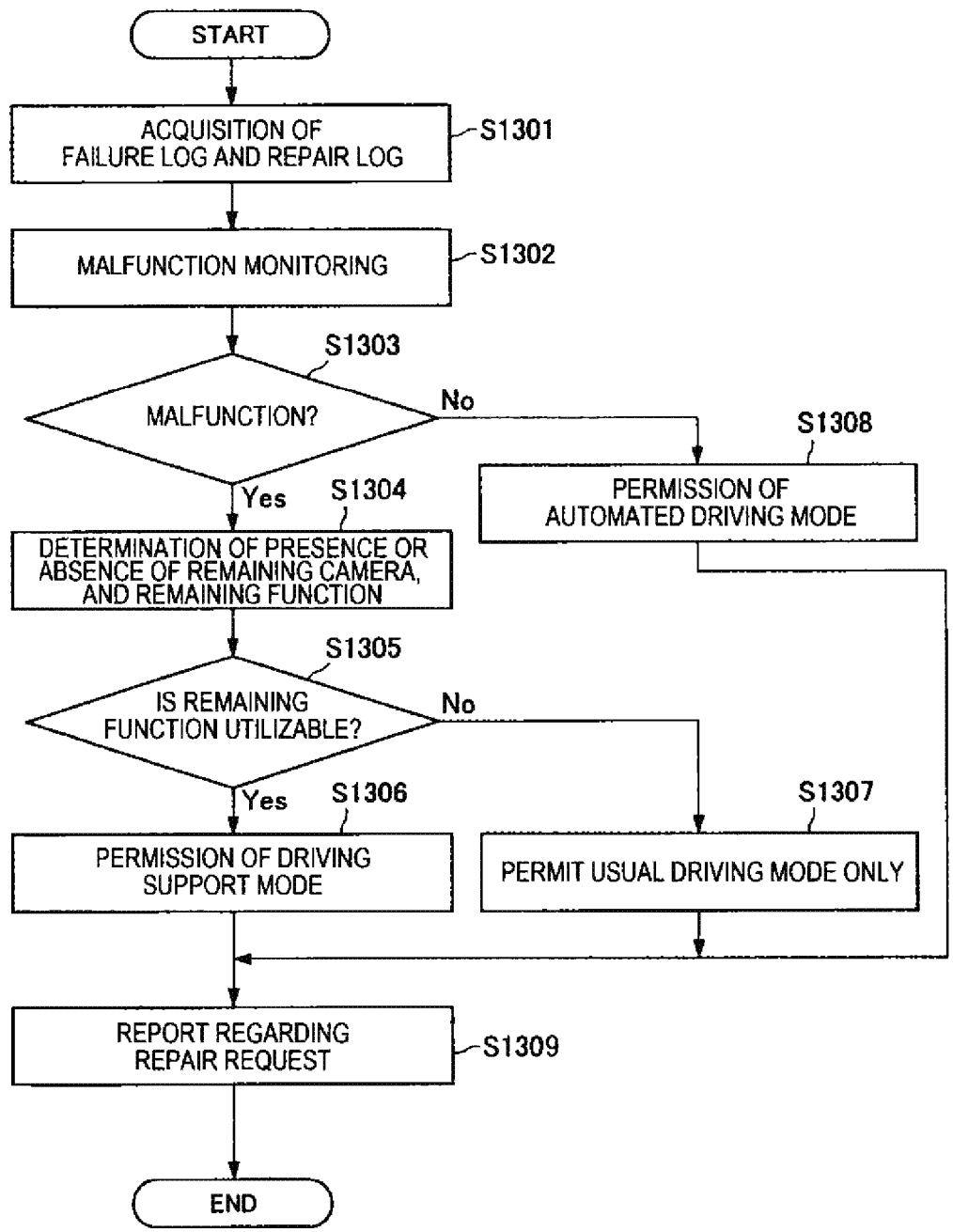

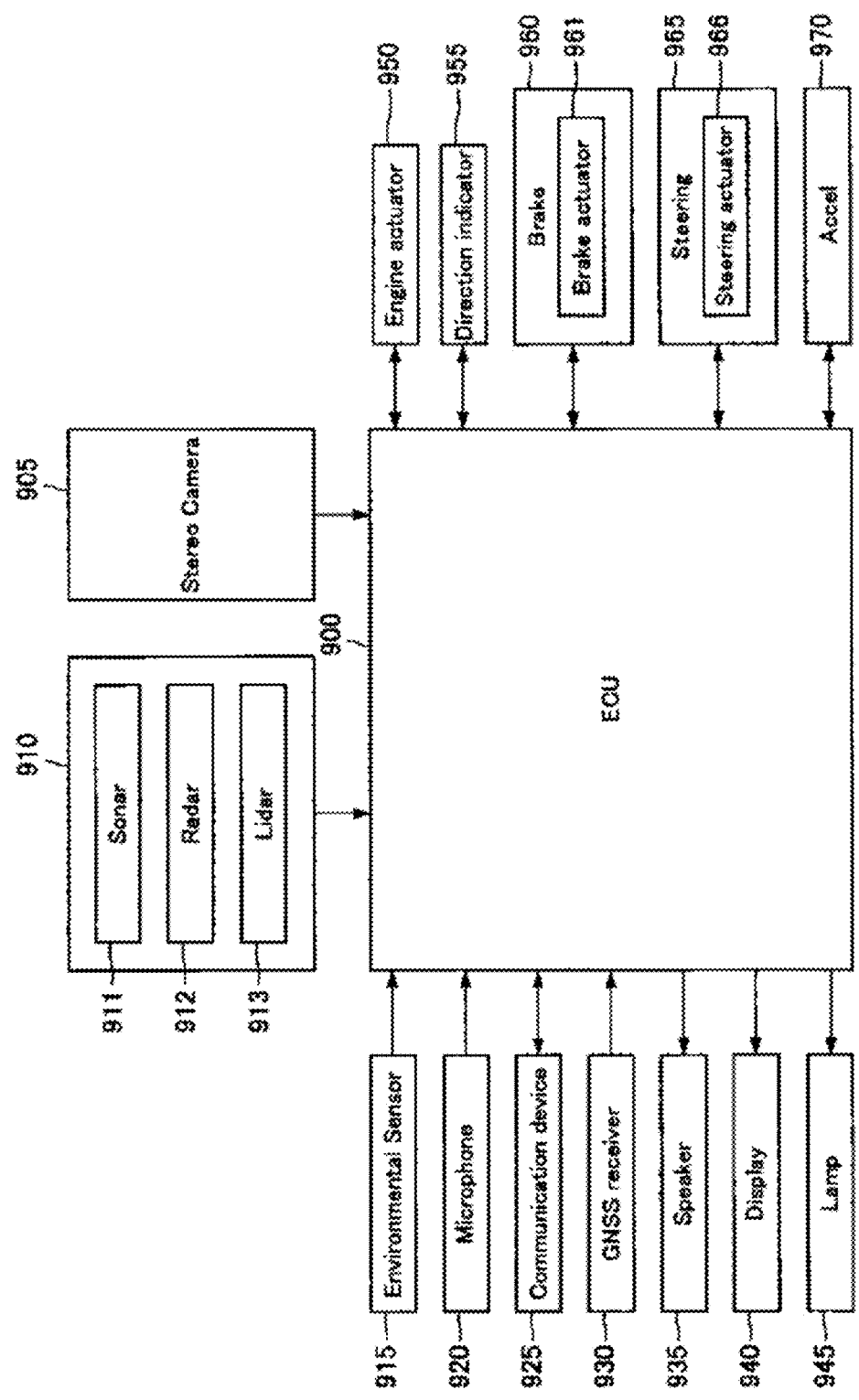

CONTROL DEVICE AND CONTROL SYSTEM

CROSS REFERENCE TO RELATED APPLICATIONS

This application claims the benefit under 35 U.S.C. § 371 as a U.S. National Stage Entry of International Application No. PCT/JP2018/030300, filed in the Japanese Patent Office as a Receiving Office on Aug. 14, 2018, which claims priority to Japanese Priority Patent Application Number JP 2017-157865 filed in the Japanese Patent Office on Aug. 18, 2017, each of which is hereby incorporated by reference in its entirety.

TECHNICAL FIELD

The present disclosure relates to a control device and a control system.

BACKGROUND ART

In recent years, many technologies relevant to automated traveling control of a vehicle have been developed. The above technologies include a mechanism for performing safer automated traveling control. For example, Patent Literature 1 discloses an automated driving control unit that redundantly and parallelly operates a plurality of automated driving execution units.

CITATION LIST

Patent Literature

PTL 1: JP 2015-162005A

SUMMARY

Technical Problem

According to an automated driving control unit described in Patent Literature 1, even when a failure occurs in one of the automated driving execution units, automated driving control by another automated driving execution unit is enabled, providing more secure safety for a user.

However, in the automated driving control unit described in Patent Literature 1, the safety is guaranteed by providing a plurality of automated driving execution units in parallel redundantly. Hence, a production cost of the device is estimated, in the automated driving control unit described in Patent Literature 1. Also, when a compound eye camera or the like used in recognition of a surrounding environment is provided in parallel, like the technology described in Patent Literature 1, periodical calibration is to be performed with regard to the compound eye camera in addition to a main camera, and maintenance work is predicted to increase.

Thus, the present disclosure proposes a new and improved control device and control system which is capable of performing safer vehicle control, even when a failure occurs in a compound eye camera.

Solution to Problem

According to an embodiment of the present disclosure, there is provided a control device including: circuitry configured to: perform driving control of a vehicle; and continue, when an abnormality of a first function of a compound eye camera used in a recognition of a surrounding environment is detected during execution of automated driving control for the vehicle, automated traveling of the vehicle on a basis of the surrounding environment estimated by a second function of the compound eye camera.

In addition, according to an embodiment of the present disclosure, there is provided a control system including: a control device including circuitry configured to perform driving control of a vehicle; and a compound eye camera that captures an image around the vehicle and recognizes a surrounding environment. The circuitry is further configured to continue, when an abnormality of a first function of the compound eye camera is detected during execution of automated driving control for the vehicle, automated traveling of the vehicle, on a basis of the surrounding environment estimated by a second function of the compound eye camera.

In addition, according to an embodiment of the present disclosure, there is provided a method including: performing control of a vehicle; and continuing, when an abnormality of a first function of a compound eye camera used in a recognition of a surrounding environment is detected during execution of automated driving control for the vehicle, automated traveling of the vehicle on a basis of the surrounding environment estimated by a second function of the compound eye camera.

In addition, according to an embodiment of the present disclosure, there is provided a non-transitory computer-readable storage medium having embodied thereon a program, which when executed by a computer causes the computer to execute a method, the method including: performing control of a vehicle; and continuing, when an abnormality of a first function of a compound eye camera used in a recognition of a surrounding environment is detected during execution of automated driving control for the vehicle, automated traveling of the vehicle on a basis of the surrounding environment estimated by a second function of the compound eye camera.

Advantageous Effects of Invention

As described above, according to embodiments of the present disclosure, safer vehicle control can be performed, even when a failure occurs in a compound eye camera.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a block diagram illustrating a functional configuration example of a control system according to an embodiment of the present disclosure.

FIG. 2 is a block diagram illustrating a functional configuration example of a compound eye camera according to an embodiment of the present disclosure.

FIG. 3 is a block diagram illustrating a functional configuration example of a control device according to an embodiment of the present disclosure.

FIG. 4 is a diagram for describing position calibration of a vanishing point according to an embodiment of the present disclosure.

FIG. 5 is a diagram for describing estimation of a surrounding environment based on a vanishing point according to an embodiment of the present disclosure.

FIG. 6 is a diagram for describing estimation of a surrounding environment based on a state of a vehicle according to an embodiment of the present disclosure.

FIG. 7 is a flowchart illustrating a sequence of a basic process by a control system according to an embodiment of the present disclosure.

FIG. 8 is a flowchart illustrating a sequence of temporary continuation of automated driving control by a control system according to an embodiment of the present disclosure.

FIG. 9 is a flowchart illustrating a sequence of operation of a control system at the time of operation start of a vehicle according to an embodiment of the present disclosure.

FIG. 10 is a block diagram illustrating a hardware configuration example of a control system according to an embodiment of the present disclosure.

DESCRIPTION OF EMBODIMENTS

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order.
1. Embodiment
 1.1. Overview of Embodiment
 1.2. Functional Configuration Example of Control System
 1.3. Functional Configuration Example of Compound Eye Camera 10
 1.4. Functional Configuration Example of Control Device 20
 1.5. Estimation of Surrounding Environment Based on Single Image
 1.6. Sequence of Process by Control System 1000
2. Hardware Configuration Example
3. Conclusion 1. Embodiments 1.1. Overview of Embodiments In recent years, introduction of automated driving is actively discussed, and it is expected that in near future automated traveling of a vehicle is enabled without driver's intervention in driving. Hence, in recent years, many technologies are researched and developed for the purpose of achieving complete automated traveling without any human labor.

On the other hand, in the present circumstances, it is still considered difficult for a system to automatically determine various situations that can occur during traveling and perform appropriate accident prevention. Hence, it is envisaged that the automated driving technologies in the present circumstances can be introduced in a zone in which three-dimensional detailed map data, such as a local dynamic map (LDM), is updated and provided at all times.

On the other hand, it is also envisaged that, even in a zone complete with the above three-dimensional detailed map data, it is difficult to correctly recognize the surrounding environment when a failure occurs in an environment recognition unit, getting into a situation in which automated driving is unable to be controlled normally. For example, when some sort of internal malfunction or external damage occurs in a compound eye camera such as a stereo camera that recognizes the surrounding environment, the compound eye camera is unable to normally perform a three-dimensional measurement function, such as disparity map computation.

In such a case, it is envisaged that the system reports to the driver that a malfunction has occurred in the compound eye camera, and shifts to a usual driving mode by the driver. However, during automated driving, the driver is not necessarily able to respond to the switching to usual driving. For example, it is also envisaged that, during the automated driving, the driver performs various secondary tasks, such as eating, reading, and communication with another passenger.

In this case, the driver is to stop a secondary task and comprehend the situation that occurred, and when not being on a driver's seat, further move to the driver's seat, and make a sitting posture, and appropriately control a steering wheel, an accelerator, a brake, etc. However, a not short time is taken for the above operation, and thus it is often difficult to immediately and safely control the vehicle, in many cases.

Hence, in order to prevent the above situation, the driver is to sit in the driver's seat in the automated driving, and pay attention to handle switching to the usual driving at all times. However, the above waiting and monitoring are realistically difficult operation for general drivers to continue performing at all times at each utilization, except for a purpose of system verification or the like, and significantly deteriorates the fundamental merit of the automated driving in which the driver can operate the secondary task during the automated driving.

Hence, in recent years, there is a necessity for a mechanism that safely maintains the automated driving, until the driver stops the secondary task and handles the switching to the usual driving, even when a malfunction occurs in an environment recognition unit while the driver is executing the secondary task. Further, when the driver who is fully accustomed to the automated driving is suddenly requested to switch to the usual driving, it is possible that the driver has less driving capability and surrounding environment recognizing capability during traveling as compared to a person who has not used the automated driving in the past. Hence, even after switching to the usual driving at the time of urgency, it is necessary to compensate for the deterioration of the above driving capability to the extent possible at the system side, while utilizing the remaining function of the compound eye camera.

The control device and the control system according to embodiments of the present disclosure are conceived of in view of the above point, and can achieve safer vehicle control, even when a failure occurs in the compound eye camera during the automated driving.

Hence, the control device and the control system according to embodiments of the present disclosure have a feature of temporarily continuing the automated traveling of the vehicle on the basis of the surrounding environment estimated by the remaining function of the compound eye camera, when a malfunction of the compound eye camera is detected.

Here, the above remaining function is a function provided by an image captured by a camera in which the malfunction does not occur, among a plurality of cameras included in the compound eye camera. For example, when the compound eye camera includes a first onboard camera and a second onboard camera, and a malfunction is detected in one of the first onboard camera and the second onboard camera, the control device and the control system according to the present embodiment can temporarily continue the automated traveling of the vehicle, on the basis of the surrounding environment captured by the other onboard camera in which the malfunction is not detected.

Specifically, the control device and the control system according to an embodiment can maintain the temporary automated traveling, on the basis of road regions, surrounding traveling vehicles including a forward vehicle, obstacles, road markers estimated from the image captured by one onboard camera that operates normally. According to the above function of the control device and the control system according to an embodiment, even when one of the onboard cameras included in the compound eye camera is in malfunction and is unable to generate a disparity map, complete loss of information regarding the surrounding environment is prevented, by performing the estimation process based on the remaining function, that is, the image captured by the other onboard camera that operates normally.

In the following, the above feature of the control device and the control system according to an embodiment will be described in detail.

1.2. Functional Configuration Example of Control System

First, a configuration example of a control system 1000 according to an embodiment of the present disclosure will be described. FIG. 1 is a block diagram illustrating a functional configuration example of the control system 1000 according to an embodiment. Referring to FIG. 1, the control system 1000 according to an embodiment includes a compound eye camera 10, a control device 20, and a control target device 30. Note that, in the following description, a case in which the control system 1000 according to an embodiment is provided in a vehicle will be described for example.

(Compound Eye Camera 10)

The compound eye camera 10 according to an embodiment has a function for capturing an image of surrounding scenery of the vehicle and recognizing the surrounding environment. In more detail, the compound eye camera 10 according to an embodiment includes a plurality of onboard cameras, and is capable of threedimensionally recognizing the surrounding environment by generating a disparity map from the images captured by the plurality of onboard cameras.

The compound eye camera 10 according to an embodiment may be a stereo camera that includes two onboard cameras, for example. On the other hand, the compound eye camera 10 according to an embodiment is not limited to the above example, but may include three or more onboard cameras. Also, the compound eye camera 10 according to an embodiment has a function for detecting a malfunction that occurs in the onboard cameras and estimating the factor of the malfunction.

(Control Device 20)

The control device 20 according to an embodiment has a function for performing vehicle driving control on the basis of the surrounding environment recognized by the compound eye camera 10. The control device 20 according to an embodiment can control the automated traveling of the vehicle on the basis of road regions, surrounding traveling vehicles, etc. recognized by the compound eye camera 10, for example.

Also, the control device 20 according to an embodiment has a feature of temporarily continuing the automated traveling of the vehicle, on the basis of the surrounding environment estimated by a remaining function of the compound eye camera 10, when a malfunction of the compound eye camera 10 is detected. The control device 20 according to an embodiment can temporarily continue the automated traveling of the vehicle, on the basis of the remaining function, that is, an estimation function that uses an image captured by another onboard camera that operates normally, when a malfunction is detected in one of the plurality of onboard cameras included in the compound eye camera 10, for example.

(Control Target Device 30)

The control target device 30 according to an embodiment is a device that executes various operation, on the basis of the control by the control device 20. The control target device 30 according to an embodiment may be a device that performs operation for driving control of an accelerator, a brake, a steering, etc., for example.

Also, the control target device 30 according to an embodiment may be a device that outputs information on the basis of the control by the control device 20. The control target device 30 according to an embodiment can be various types of display devices that display visual information, and a speaker that outputs sound information, or the like, for example. Also, the control target device 30 according to an embodiment may be a light source, such as a lamp, that emits light on the basis of the control by the control device 20.

In the above, the functional configuration example of the control system 1000 according to an embodiment has been described. Note that the above functional configuration described by using FIG. 1 is just an example, and the functional configuration of the control system 1000 according to an embodiment is not limited to such an example. The control system 1000 according to an embodiment may further include a component not illustrated in FIG. 1. The control system 1000 according to an embodiment may further include various types of sensor devices that collect sensor information regarding the surrounding environment, and an environment recognition unit other than the compound eye camera, for example. The above environment recognition unit includes a sonar, a millimeter-wave radar, a Lidar, or the like, for example. The functional configuration of the control system 1000 according to an embodiment may be changed flexibly, depending on specification and operation.

1.3. Functional Configuration Example of Compound Eye Camera 10

Next, a functional configuration example of the compound eye camera 10 according to an embodiment of the present disclosure will be described. FIG. 2 is a block diagram illustrating the functional configuration example of the compound eye camera 10 according to an embodiment. Referring to FIG. 2, the compound eye camera 10 according to an embodiment includes an image capturing unit 110, a map generation unit 120, an environment recognition unit 130, a diagnosis unit 140, and a communication unit 150.

(Image Capturing Unit 110)

The image capturing unit 110 includes a plurality of onboard cameras 115, and has a function for capturing images of the surrounding environment. In the case of an example illustrated in FIG. 2, the image capturing unit 110 includes two onboard cameras 115*a* and 115*b*. Here, the onboard camera 115*a* corresponds to a first onboard camera in an embodiment of the present disclosure, and the onboard camera 115*b* corresponds to a second onboard camera.

Also, the image capturing unit 110 executes calibration of a positional relationship between the onboard cameras 115a and 115b regularly or irregularly, and updates a calibration value of the calibration.

(Map Generation Unit 120)

The map generation unit 120 has a function for generating a disparity map (also referred to as distance image or depth image) on the basis of the image captured by the image capturing unit 110. That is, the map generation unit 120 generates a surrounding environment map that has three-dimensional information, on the basis of a disparity between two images captured by the onboard cameras 115a and 115b.

(Environment Recognition Unit 130)

The environment recognition unit 130 has a function for executing various recognition processes relevant to the surrounding environment, on the basis of the disparity map generated by the map generation unit 120. The environment recognition unit 130 can recognize a road region, a surrounding traveling vehicle, a walker, an obstacle, a road marker, or the like, for example.

The environment recognition unit 130 may detect a compartment line such as a lane line on a road, for example, and may recognize a road region on the basis of the compartment line. Note that the compartment line according to an embodiment includes paint depicted on a road surface, as well as a stuff formed from an object such as a stud and a stone. Also, the compartment line according to an embodiment includes a roadway center line, a lane boundary line, a roadway outside line, a crosswalk instruction line, etc.

Also, the environment recognition unit 130 recognizes surrounding traveling vehicles that include a forward vehicle, for example. The environment recognition unit 130 according to an embodiment can recognize the position, the distance, etc. of the forward vehicle, for example.

Also, the environment recognition unit 130 according to an embodiment has a feature of estimating the surrounding environment on the basis of the image captured by one of the onboard cameras 115 that operates normally, even when a malfunction occurs in one of the onboard cameras 115a and 115b, or even when synchronization is not established between the cameras. The above function of the environment recognition unit 130 according to an embodiment will be described in detail later.

(Diagnosis Unit 140)

The diagnosis unit 140 has a function for detecting a malfunction that occurs in the image capturing unit 110. When a signal from the onboard camera 115a or 115b is not detected, or when an abnormality, such as a black region, occurs in a part or all of the image captured by the onboard camera 115a or 115b, the diagnosis unit 140 detects that a malfunction is present in the corresponding onboard camera 115a or 115b, for example. Also, the diagnosis unit 140 may detect that a malfunction occurs in the onboard camera 115a or 115b, when the map generation unit 120 is unable to generate a normal disparity map from the images captured by the onboard cameras 115a and 115b, for example.

Also, the diagnosis unit 140 has a function for estimating a factor of the malfunction that occurs in the image capturing unit 110. The diagnosis unit 140 can also estimate that the malfunction is due to blocking of the optical path by adherence of dust or the like, when a black region occurs in the image captured by the onboard camera 115a but there is no abnormality in the signal obtained from the onboard camera 115a, for example.

(Communication Unit 150)

The communication unit 150 has a function for performing information communication with the control device 20. More specifically, the communication unit 150 transmits, to the control device 20, various recognition information recognized by the environment recognition unit 130, and the information regarding the malfunction and the estimated factor detected by the diagnosis unit 140. Also, the communication unit 150 may transmit, to the control device 20, the images captured by the onboard cameras 115a and 115b, and the information regarding the disparity map generated by the map generation unit 120.

In the above, the functional configuration example of the compound eye camera 10 according to an embodiment has been described. Note that the above configuration described by using FIG. 2 is just an example, and the functional configuration of the compound eye camera 10 according to an embodiment is not limited to such an example. For example, the map generation unit 120, the environment recognition unit 130, and the diagnosis unit 140 may be configured as the function of the control device 20. The functional configuration of the compound eye camera 10 according to an embodiment may be changed flexibly, depending on specification and operation.

1.4. Functional Configuration Example of Control Device 20

Next, a functional configuration example of the control device 20 according to an embodiment of the present disclosure will be described. FIG. 3 is a block diagram illustrating the functional configuration example of the control device 20 according to an embodiment. Referring to FIG. 3, the control device 20 according to an embodiment includes a control unit 210, a driver recognition unit 220, a learning unit 230, and a communication unit 240.

(Control Unit 210)

The control unit 210 has a function for performing vehicle driving control on the basis of the external environment recognized by the compound eye camera 10. Here, the control unit 210 according to an embodiment has a feature of temporarily continuing the automated traveling of the vehicle, on the basis of the surrounding environment that the environment recognition unit 130 estimates by the remaining function of the image capturing unit 110, when the diagnosis unit 140 detects a malfunction of the image capturing unit 110.

In more detail, when the diagnosis unit 140 detects a malfunction in one of the onboard cameras 115a and 115b, the control unit 210 can temporarily continue the automated traveling of the vehicle, on the basis of the surrounding environment that the environment recognition unit 130 estimates from the image captured by the other onboard camera 115 in which the malfunction is not detected.

Here, the control unit 210 according to an embodiment may temporarily continue the automated traveling of the vehicle, on the basis of the road region and the zone road situation that the environment recognition unit 130 estimates from the image captured by a single onboard camera 115, updated map information of acquirable LDM, etc., for example. The control unit 210 can cause the vehicle to temporarily perform the automated traveling, so as not to deviate from the compartment line, on the basis of the road region that the environment recognition unit 130 estimates from the compartment line included in the image, for example.

Also, the control unit 210 according to an embodiment may temporarily continue the automated traveling of the vehicle, on the basis of the position of the forward vehicle that the environment recognition unit 130 estimates from the image captured by a single onboard camera 115, for example. The control unit 210 can temporarily continue the automated traveling of the vehicle, so as to follow the forward vehicle, on the basis of the distance to the forward vehicle estimated by the environment recognition unit 130, for example.

Also, the control unit 210 according to an embodiment may temporarily continue the automated traveling of the vehicle, until the driver recognition unit 220 detects a driving restart by the driver. According to the above function of the control unit 210 according to an embodiment, the control of the driving is taken over to the driver more safely, by temporarily continuing the automated traveling by using the remaining function of the compound eye camera 10, from the occurrence of the failure in the compound eye camera 10 to the restart of the driving by the driver from a secondary task.

Also, according to the above function of the control unit 210 according to an embodiment, the control of the driving is taken over to the driver, without urgently pulling over the vehicle, and thus a secondary disaster due to sudden stop, interference with the traveling of the surrounding vehicles in a heavy traffic road, etc. can be prevented. Note that, in a case where the vehicle is urgently pulled over promptly when the system detects a failure of the function of the compound eye camera 10 in a situation where the traveling zone is in a tunnel or at a spot such as an end of a curve with poor visibility, it is possible that the following car fails to timely acknowledge the urgent pulling over of the above vehicle and bumps. Further, an event can occur in various situations, such as immediately before reaching a single lane zone which is a bottleneck in an arterial road. Thus, in view of the influence on the following car, it is desirable to search the LDM or the like for a spot that can reduce the risk of provoked accident and traffic jam influence, from traffic jam provoking influence or the like of the relevant zone passage when the zone pulling over, and guide and move the vehicle to the spot that has less influence on surrounding circumstances, and urgently stop the vehicle.

On the other hand, the control unit 210 according to an embodiment may execute safety stop control of the vehicle, when the driving restart by the driver is difficult in an allowable restart time. The control unit 210 according to an embodiment executes the safety stop control of the vehicle, when the estimated restart time of the driver estimated by the driver recognition unit 220 exceeds the allowable time, for example. Here, the control unit 210 causes the information regarding the safety stop to be reported to the driver and the surrounding traveling vehicles, and thereafter performs deceleration control, and causes the vehicle to stop at a site that is estimated to be safer, such as a passing place.

According to the above function of the control unit 210 according to an embodiment, the vehicle is not stopped suddenly, but warning is issued to the surrounding traveling vehicles, and then the vehicle is decelerated and stopped, ensuring more safety. That is, the influence of the vehicle having failure on the infrastructure is made smallest, by causing the vehicle to travel to an urgent pulling-over appropriate spot. Here, the urgent pulling-over appropriate spot is a spot or a zone on the map which does not cause, or minimizes the influence of, sight interference, cruise speed disturbance, the risk and traffic jam provoking factor to other traveling vehicles in the traveling route, by pulling over the vehicle.

In the above, an example of the control by the control unit 210 according to an embodiment has been described. Note that the control unit 210 can perform the above process, by controlling various control target devices 30 relevant to traveling and information reporting of the vehicle.

(Driver Recognition Unit 220)

The driver recognition unit 220 has a function for recognizing the state and action of the driver. The driver recognition unit 220 can recognize the expression of the driver, and the action such as the secondary task, on the basis of the image captured by the camera provided in the vehicle interior, for example. Also, the driver recognition unit 220 can recognize the sight line, the head motion, or the like of the driver, by a known recognition technology that uses the image and the light source, for example.

Also, the driver recognition unit 220 estimates a driving restart time that it takes until the driver restarts the driving, on the basis of the state of the recognized driver. Here, it is expected that the experience and the characteristics relevant to the driving of the driver have a large influence on the above driving restart time. Hence, the driver recognition unit 220 according to an embodiment may estimate the driving restart time on the basis of the characteristics of the driver learned by the learning unit 230. According to the above function of the driver recognition unit 220 according to an embodiment, a more accurate driving restart time can be estimated, and the safer driving control can be performed, in consideration of individual variation.

(Learning Unit 230)

The learning unit 230 has a function for learning the characteristics relevant to the driving of the driver. With regard to the restart characteristics relevant to the restart to the usual driving of the driver, the learning unit 230 can learn the restart characteristics from eyeball behavior analysis and pupil behavior analysis of the driver, restart sequence analysis, success or failure of an actual restart steering history specific to the driver based on a living body signal analysis index, etc. That is, the restart characteristic learning necessary to estimate the restart time specific to the driver is performed from observable wakefulness of the driver. The learning unit 230 achieves the above learning by using a technology such as neural network, for example.

(Communication Unit 240)

The communication unit 240 has a function for performing information communication with the compound eye camera 10 and the control target device 30. Specifically, the communication unit 240 receives the recognition information and the information regarding the malfunction from the compound eye camera 10. Also, the communication unit 240 transmits a control signal generated by the control unit 210 to the control target device 30. Also, the communication unit 240 receives various information necessary for the control from the control target device 30. Also, the communication unit 240 can receive information collected by various external devices. For example, the communication unit 240 may receive sensor information collected by the external devices, and a report or the like transmitted by the external devices.

In the above, the functional configuration example of the control device 20 according to an embodiment has been described. Note that the above functional configuration described by using FIG. 3 is just an example, and the functional configuration of the control device 20 according to an embodiment is not limited to such an example. For example, the driver recognition unit 220 and the learning unit 230 may be configured as functions of a device that differs from the control device 20. On the other hand, as described above, the control device 20 may have the functions equivalent to the map generation unit 120, the environment recognition unit 130, and the diagnosis unit 140. The functional configuration of the control device 20 according to an embodiment may be changed flexibly, depending on specification and operation.

1.5. Estimation of Surrounding Environment Based on Single Image

Next, estimation of the surrounding environment based on a single image by the environment recognition unit 130 will be described in detail. As described above, the environment recognition unit 130 according to an embodiment can estimate the surrounding environment, on the basis of a single image captured by one onboard camera 115 that operates normally.

Here, the environment recognition unit 130 according to an embodiment can estimate the surrounding environment, on the basis of the calibration value of each onboard camera 115 when the map generation unit 120 generates the disparity map by using the images captured by both of the onboard cameras 115a and 115b.

Usually, it is necessary to correctly calibrate the positional relationship between the onboard cameras 115a and 115b, so that the map generation unit 120 generates an accurate disparity map. However, it is also envisaged that the above positional relationship changes, depending on factors such as impact from the outside, and change of humidity and temperature, and mechanical stress. Hence, in order to generate the accurate disparity map, the calibration is to be executed regularly or irregularly regarding the positional relationship between the onboard cameras 115a and 115b, to update the calibration value each time.

Hence, the environment recognition unit 130 according to an embodiment inversely calculates the characteristics of the onboard camera 115 that operates normally, by referring to the calibration value updated by the final calibration by the image capturing unit 110, and estimates a more accurate surrounding environment on the basis of the captured single image.

For example, there is known the method that utilizes compartment lines Dl and Dr, and a vanishing point VP in the calibration for the onboard cameras 115a and 115b. When there are ideally parallel two compartment lines Dl and Dr, and the compartment lines Dl and Dr extend horizontally, the intersection point of the compartment lines Dl and Dr, i.e., the vanishing point VP is estimated to be positioned on the horizontal line. The above vanishing point VP is a starting point from which the transition of outside scenery associated with the traveling flows and moves when the traveling of the vehicle is translation, and if accurate optical flows are obtained for all points of the acquired image, all directions of the arrows of the optical flow vectors can be depicted with respect to the starting point. However, the computation amount of the optical flow is large usually, and many environmental still feature points are necessary in the image. Hence, the geometric intersection point of an on-road parallel object that is parallel with the traveling of the host vehicle, which can be utilized more simply, is identical with the vanishing point VP at the time of parallel traveling, and thus it is effective to calibrate by using the compartment line on the road. However, as described later, the above method is limited to the infinity intersection point of the parallel components in the traveling forward direction, and thus it is necessary to perform its determination.

Here, in order to obtain a correct vanishing point VP from two images captured by the onboard cameras 115a and 115b, it is necessary to absorbs, i.e. calibrate, the difference of the disparity of the vanishing point VP calculated from the images captured by the onboard cameras 115a and 115b respectively. Hence, the environment recognition unit 130 according to an embodiment calibrates the position of the vanishing point VP calculated from the single image Pic, by using the calibration value obtained when the above calibration is performed at the time of final calibration, and detects the positions of the compartment lines Dl and Dr with higher accuracy.

FIG. 4 is a diagram for describing position calibration of the vanishing point VP according to an embodiment. In order to facilitate the understanding of explanation, a case in which the direction difference of the onboard camera 115 occurs will be described, with respect to the horizontal left-right direction only. On the left side of FIG. 4, a vehicle SC provided with the control system 1000, and parallel two compartment lines Dl and Dr provided in the road on which the vehicle SC travels, are illustrated. Note that it is not possible to predicate whether or not the compartment lines Dl and Dr are actually parallel lines only from an acquired image, and thus it can be determined by the assumed plane and the corresponding plane extending to the horizontal infinity during a period in which the compound eye camera 10 functions normally. On the other hand, in a situation in which only one of the onboard cameras 115 is utilizable, it is determined whether or not the compartment line depicted on the road surface is a narrowing or widening non-parallel compartment line, by setting a determination criterion that a boundary extension line forming a line segment does not move in the right angle direction relative to the line segment in inter-frame correlation. That is, the line segment that is in parallel with the forward direction of the vehicle is displayed at all times on the same line segment in time-series images, but when forming an angle relative to the forward direction, makes a translational lateral movement relative to the parallel line segment. Without this determination, when only the compartment line Dr narrows relative to the compartment line Dl as the compartment line Dr goes ahead on the road surface for example, the intersection point of both compartment lines is misaligned from the vanishing point VP associated with the practical traveling and goes down to the lower left in the single acquired frame, and this intersection point is misaligned as a result, even if the attachment itself of the camera is not misaligned relative to the forward direction of the vehicle. Hence, if the above determination is not performed and the intersection point is calculated from the detected line segments of one frame image simply and is applied to the calibration, an error is included, and thus the intersection point is incorrect as the vanishing point VP for deciding the forward direction. However, when the vehicle laterally shifts to left or right on the road surface, or when the relative distance relationship of the onboard camera from the parallel line segment, such as the relative height between the onboard camera and the road surface, changes, the displayed line segment rotates and moves with respect to the rotation center axis at the infinity point VP even if the forward direction of the vehicle body is constant, and in that case the intersection point of the line segment representing the vanishing point VP does not change.

Here, the onboard camera 115b that normally functions, among the onboard cameras 115 provided in the vehicle SC, is located and misaligned in the horizontal direction by an angle Δθ, relative to the forward direction DM of the vehicle SC.

When the projection method of image capturing of the onboard camera 115 is assumed to be a center projection method in which the optical axis is directed to infinity in order to simplify the description, a false vanishing point FVP is calculated at a site away from the original vanishing point VP by $f*\tan(\theta)$, in the single image Pic captured by the onboard camera 115b illustrated in the right side in the drawing. Here, the environment recognition unit 130 according to an embodiment can calculate the position of the correct vanishing point VP, by using the calibration value at the time of the final calibration, that is, the value $f*\tan(\Delta\theta)$. Note that the above f is an example in which the onboard camera 115b adopts the image projection method of the center projection method, and indicates a focal length f. Also, the misalignment amount in the vertical direction, i.e. the pitch direction, in the forward direction can be corrected by a method similar to the above. As described later in FIG. 6, movement of the vanishing point VP can occur due to the loading balance of the vehicle, the balance of the front and rear suspension devices, and the pitch change of the vehicle during braking, in addition to the misalignment of the attachment of the onboard camera 115. The vertical position of the vanishing point VP on the forward-direction infinity plane is a point of reference for estimating the distance to the forward object particularly, and thus is important reference position information for estimating the distance by the other onboard camera 115 that remains, when one onboard camera 115 of the compound eye camera 10 malfunctions. Hence, utilization is desirable, while preventing error occurrence associated with traveling misalignment, by referring to the vanishing point VP as the stored value obtained by the calibration work before malfunction, and additionally calibrating regularly or irregularly. Although the correction amount is set to $f*\tan(\Delta\theta)$ by assuming the camera of the projection method of center projection in order to simplify the assumption, the correction is performed in accordance with its image-height-to-direction characteristics when an image is captured by using another projection method.

Also, FIG. 5 is a diagram for describing the estimation of the surrounding environment based on the vanishing point according to an embodiment. In FIG. 5, a single image Pic captured by one onboard camera 115 that operates normally is illustrated. Here, in the single image Pic, the compartment lines Dl and Dr, the vanishing point VP, and a forward vehicle AC1 are illustrated. Here, the vanishing point VP in FIG. 5 may be the vanishing point calibrated by the method described by using FIG. 4.

Here, the environment recognition unit 130 according to an embodiment can estimate, as the road region R, the region between the compartment lines Dl and Dr detected on the basis of the calibrated vanishing point VP, for example. The above function of the environment recognition unit 130 according to an embodiment can provide a lane keep assist system (LKAS) function of high accuracy by using only the single image Pic captured by a single onboard camera 115, even when a malfunction occurs in one of the onboard cameras 115. In particular, the LKAS function is desirably achieved by the forward region estimation of the vehicle width that the host vehicle occupies. In this case, in a detection situation in which there is a region where the existence probability of a detected object other than the road surface is low and the road surface is estimated with higher probability at the image upper portion than at the left and right boundaries comparted by the region between the compartment lines Dl and Dr, the zone allows the host vehicle to travel and proceed with higher probability. Segmentation that performs texture analysis, a motion stereo method by inter-frame time-series transition of road surface pattern, or the like may be used in the road surface region estimation in the single onboard camera 115.

Also, the environment recognition unit 130 according to an embodiment may estimate the distance L to the forward vehicle AC1 on the basis of the vanishing point VP. It is known that the distance from the onboard camera 115 for capturing an image to the object in the plane that extends to the infinity and does not include the onboard camera 115, i.e., the road surface plane, is inversely proportional to projection distance (to a road surface contacting point) in the vertical image direction from the vanishing point VP (the horizontal line including it), in the case of the image acquired by utilizing the projection image of center projection. However, the above distance is unable to be directly obtained as an absolute distance, but a reference distance is necessary, because the separation distance from the vanishing point (=infinity point) VP on the projection image fluctuates according to the distance from the above plane relevant to the onboard camera 115, i.e., according to the attachment height position of the onboard camera 115 to the vehicle body in relation to the road surface. Specifically, the height of the onboard camera 115 and the road surface is a factor of fluctuation. Hence, the calibration work necessary for distance estimation of individual onboard camera 115 single body may be performed at the time of product shipment, but it is desirable to utilize the onboard camera 115 by performing the calibration each time in consideration of the change of the vanishing point VP due to the load amount, the balance, and the like to the vehicle body as described above. While the function of the compound eye camera 10 effectively functions as usual, the distance estimation of the forward vehicle AC1 and the on-road object can be performed by distance calculation with the disparity map, or may use the distance detected by a radar or a LIDAR. For example, the separation distance h to the vanishing point VP from the road surface contacting point on the acquired image is calculated, when the forward vehicle AC1 or an estimated road surface standing object is detected. Here, the relationship of $L=A*(1/h)$ is established, if the camera employs the projection method of center projection. Here, if the separation distance from the road surface contacting point to the vanishing point VP on the image at the distance $L_0$ is $h_0$, the coefficient A is a coefficient decided by the focal length of the utilized onboard camera 115, and the coefficient A can be calculated from the distance estimated by the compound eye camera 10. Thereafter, even if one of the onboard cameras 115 is in malfunction, the value of the coefficient A obtained by the calibration is invariable as long as the attachment height to the vehicle body does not fluctuate, and thus this work is the calibration necessary to estimate the distance with the single eye. Hence, it may be repeatedly performed at the time of normal operation, in order to calculate the stabilized value of the coefficient A, and a statistically stable average value may be used. That is, main obstacles such as a vehicle, a walker, and a bike that appear in the host vehicle forward direction at the time of traveling are assumed as on-road quasi-standing objects, and thus even the single onboard camera 115 can estimate the distance from the onboard camera 115 to the road surface contacting point if the road surface contacting point of the three-dimensional object is comprehended and detected. Hence, the environment recognition unit 130 determines the road surface contacting point of the obstacle detection region (estimated three-dimensional object) that is not the frontward road surface pattern, with reference to the vanishing point VP, and thereafter estimates the separation distance h of the image to the road surface contacting point, and calculates a standing position point distance $L=L_0*(h_0/h)$ of the object from the onboard camera 115 from the inverse (1/h) of the separation distance to the vanishing point VP. That is, the distance L is inversely calculated from the acquired image of the forward vehicle AC1 that appears in the single image Pic. Note that a relative speed may be further estimated from the time differential value as necessary.

Also, the environment recognition unit 130 according to an embodiment may estimate the distance L on the basis of the size of a partial region of the forward vehicle AC1. For example, the environment recognition unit 130 recognizes the number plate NP that the forward vehicle AC1 has, and estimates the distance L by comparing the size of the recognized number plate NP with a reference size associated with the reference distance. Also, the environment recognition unit 130 recognizes the interval between the lamps Ll and Lr of the forward vehicle AC, and estimates the distance L by comparing the interval with a reference interval associated with the reference distance. When the distance L is estimated from the road surface contacting point, the distance L is calculated from the projection distance on the image to the vanishing point VP, but an arbitrary object size becomes invisible at the infinity, and the distance is inversely proportional to the two-dimensionally projected single axis dimension. Hence, as described later, once the distance to the object at the forward direction is known, the distance fluctuation can be calculated from the subsequent dimension change. That is, with regard to the detection object (for example, the width w of the number plate NP, etc.) whose dimension is detected as $w_0$ at the distance $L_0$, the distance L is $L=L_0*(w_0/w)$ when the dimension changes to w. On the other hand, when not the dimension but the area S is used for calculation, it is necessary to utilize the inverse of its square root. That is, with regard to the distance L, $L=L_0*(S_0/S)^{(1/2)}$ is established. However, in this method, the tracking and the distance estimation are enabled, only after capturing is once performed in the forward direction and the calibration is performed by using the distance from the disparity map at the time of compound eye camera normal operation and the value captured by the absolute distance measurement function such as a millimeter wave radar and a LIDAR. Note that a number plate width or the like that does not have an individual fluctuation factor such as a vehicle width light and a vehicle width is standardized in the entire society, and there is a dimension standard, and thus they are utilizable in the distance estimation without tracking each time, by once performing the calibration of the system that calculates the distance from the detected dimension.

The above function of the environment recognition unit 130 according to an embodiment can provide an adaptive cruise control (ACC) function of high accuracy by using the single image Pic only, even when a malfunction occurs in one of the onboard cameras 115. As described above, the distance estimation to the forward traveling vehicle can use a different way, such as calculation from the road surface contacting point, distance fluctuation calculation from the detected dimension, and distance fluctuation calculation from the detected area. On the other hand, in the former calculation from the road surface contacting point, the error becomes apparent when the correction is not performed accurately according to the inclination amount when the road surface is vertically inclined to the plane in which the host vehicle exists. Further, with regard to the road surface contacting point and an actual on-road approaching object, a large cargo vehicle or the like particularly differs in forward-backward position, and protrudes to the backward direction of the traveling direction by several meters relative to the road surface contacting point, in some cases. Also, it is possible to estimate the fluctuation of the approaching distance by the dimension change of the detection object being the above forward vehicle AC1, but the absolute distance is unable to be acquired directly. That is, it is desirable to perform several advance modifications in order to estimate the distance accurately and easily by one onboard camera 115 that remains, if the distance estimation function of the compound eye camera 10 is disabled instantaneously. That is, it is desirable to constantly perform the calculation of the above coefficient for performing the distance estimation from the road surface contacting point by the single onboard camera 115, the calculation of the coefficient fluctuation range that fluctuates due to the vehicle load, and further the calculation of the fluctuation of the vanishing point VP by the pitch fluctuation, during traveling, and when the forward vehicle AC1 is detected, constantly perform the coefficient calculation in order to estimate the distance from the inverse of the feature dimension such as the vehicle width light of the vehicle, during the traveling. The estimation calculation can also be performed from the standardized number plate and the tread (the left-right wheel interval of the vehicle) which is limited to a certain degree depending on vehicle type.

Also, the environment recognition unit 130 according to an embodiment can also estimate the surrounding environment based on the state of the vehicle. As described above, the movement of the calculated vanishing point VP can occur due to the state of the vehicle, such as the loading balance of the vehicle, the balance of the front and rear suspension devices, and the pitch change of the vehicle associated with the braking, in addition to the attachment misalignment of the onboard cameras 115. Hence, the environment recognition unit 130 according to an embodiment can correct the misalignment amount in the vertical direction in the forward direction, i.e. the pitch direction, by a method similar to the above calibration in the lateral direction. FIG. 6 is a diagram for describing the estimation of the surrounding environment based on the state of the vehicle according to an embodiment.

The upper part of FIG. 6 illustrates the vehicle SC in the normal state, a view angle AV1 for the onboard camera 115 that operates normally in that state to capture an image of the road region R in the forward direction, and a single image Pic1 captured by the onboard camera 115 at the view angle AV1.

On the other hand, the lower part of FIG. 6 illustrates the vehicle SC that is in a forward inclined state with a pitch change due to the loading balance that changes by the influence of baggage, passenger, or the like, a view angle AV2 for the onboard camera 115 that operates normally in that state to capture the road region R in the forward direction, and a single image Pic2 captured by the onboard camera 115 at the view angle AV2.

Here, when the single images Pic1 and Pic2 are compared, it is known that the interval between the compartment lines Dl and Dr in the single image Pic1 is narrower than the interval between the compartment lines Dl and Dr in the single image Pic2 captured in the state in which the pitch change occurs in the vehicle SC.

As described above, when the vehicle load balance, the balance of the front and rear suspension devices, and the pitch change of the vehicle associated with braking occur, the view angle AV2 of the onboard camera 115 gets close to the vehicle SC direction, and thus it is estimated that the interval between the compartment lines Dl and Dr in the captured single image Pic2 expands in a more front direction than in the usual state.

Hence, the environment recognition unit 130 according to an embodiment recognizes the state of the vehicle SC in which the pitch change illustrated in the lower part of FIG. 6 occurs, and calibrates the detected positions of the compartment lines Dl and Dr on the basis of the degree of the recognized pitch change, and thereby estimates the road region R more accurately. For this purpose, the environment recognition unit 130 may constantly perform the calculation of the fluctuation of the vanishing point VP due to the pitch fluctuation, during traveling. In particular, the pitch fluctuation of the vehicle body occurs when acceleration or braking is applied, but the compartment line intersection point detected during the acceleration shifts from the true vanishing point associated with the traveling by the fluctuation amount of the pinch angle due to the acceleration, and therefore becomes inaccurate distance estimation if the road surface contacting point of the forward direction object and the separation distance of the above temporary compartment line intersection point are used without correcting vertical fluctuation. Note that, if the fluctuating pitch angle $\Delta\varphi$ (not illustrated) by a pitch sensor is known, the vanishing point VP defined by the horizontal line may be corrected by $f^*\tan(\Delta\varphi)$ in the vertical direction, similarly to the difference in the lateral direction.

Note that FIG. 6 has described a case in which the environment recognition unit 130 performs the calibration regarding the detected positions of the compartment lines Dl and Dr on the basis of the inclination in the front-back direction of the vehicle SC for example, but the environment recognition unit 130 recognizes various states regarding the vehicle SC, and can perform the calibration of the detected positions. For example, the environment recognition unit 130 may perform the calibration of the detected positions on the basis of the inclination in the left-right direction of the vehicle SC.

1.6. Sequence of Process by Control System 1000

Next, a sequence of a process by the control system 1000 according to an embodiment will be described in detail. First, the sequence of the basic process by the control system 1000 according to an embodiment will be described. FIG. 7 is a flowchart illustrating the sequence of the basic process by the control system 1000 according to an embodiment.

Referring to FIG. 7, first, the diagnosis unit 140 of the compound eye camera 10 monitors a malfunction of the image capturing unit 110 (S1101).

Here, if the malfunction of the image capturing unit 110 is not detected (S1102: No), the diagnosis unit 140 returns to step S1101, and continues the above monitoring.

On the other hand, when the malfunction of the image capturing unit 110 is detected (S1102: Yes), the diagnosis unit 140 subsequently determines presence or absence of a remaining camera, that is, an onboard camera 115 that operates normally, and a remaining function that can be utilized in this situation (S1103).

Here, if the diagnosis unit 140 determines that there is a utilizable remaining function on the basis of the image captured by the onboard camera 115 that operates normally (S1104: Yes), the control unit 210 of the control device 20 temporarily continues the automated driving control that uses the remaining function (S1105).

On the other hand, if the diagnosis unit 140 determines that there is no utilizable remaining function on the basis of the image captured by the onboard camera 115 that operates normally (S1104: No), the control unit 210 transmits a report regarding the situation to the driver and the surrounding traveling vehicles, and thereafter decelerates the vehicle, and pulls the vehicle over at a safe site (S1106). Note that, if the malfunction is in a traveling zone in which straight traveling is expected to continue for a while, by the newest LDM information or the like that is updated at all times, it is possible to move to a safe site, but for example if the malfunction occurs in a twisting winding road or the like, it is desirable to pull the vehicle over as quickly as possible. Hence, with regard to the detailed control sequence, the control may be performed in accordance with finer situation determination, for each use case according to the LDM map information, the latest road condition, or the like.

Also, after the temporary continuation of the automated driving control in step S1105 or the process of the safety stop control in step S1106 is completed, the control unit 210 associates and stores the information regarding the malfunction of the image capturing unit 110 diagnosed by the diagnosis unit 140 and the control detail for the malfunction, as a failure log (S1107). Here, a time stamp or the like may be additionally attached to the malfunction and a series of log information of subsequent dealing control and be recorded as temporal sequence information, in order to clarify the correlation between dealing situation, utilized form, and event occurrence.

Also, the control unit 210 causes a report regarding a repair request of the compound eye camera 10 to be reported to the driver (S1108). Note that, here, when a report that uses simple sound, alarm, or the like or a haptics report is transmitted only passively with regard to the above report regarding the repair request, there is a risk of continuous utilization with the failure occurring, unless the user comprehends the urgency and the necessity of the repair. In particular, the state changes from a traveling state in which the user accustomed to the automated driving unconsciously receives the safety assist of the system to a state in which the assist function is disabled, and thus in a desirable form of the report regarding the repair request, the report is repeatedly transmitted continually until the repair is performed without disturbing the driving operation in order to prompt the early repair. The actual urgency degree of the movement that utilizes the car and the urgency degree of the repair depend on the necessity of the repairer, and thus for example, the handling largely depends on situations, such as utilization during moving from a remote area to an urban area where repair can be performed, a case without repair components, a case on a holiday in which it is difficult to perform urgent repair, and a case in which an emergency patient is urgently transported to a hospital. Hence, implementation examples also include: shortening the interval of the report regarding the repair request in a phased manner; recording an acceptance input to the prod by the above report; adding a record in response to a situation where utilization is conducted repeatedly and continually without repair despite the acceptance; wirelessly reporting to the outside; imposing a penal traveling upper limit speed according to its violation amount; and the like. In any case, the malfunction of the compound eye camera 10 in the automated driving does not become a factor that disturbs the traveling itself in the usual manual driving, and thus it is necessary to prevent the risk of the user neglecting the repair or postponing the repair. Hence, in the system that allows the traveling even when a malfunction occurs in a part of the automated driving system, the scheme for consciously prompting the user to conduct early repair is a socially useful way for ensuring the safety. The above repair report form and method are an example that illustrates one aspect of the example at the time of partial functional malfunction of the compound eye camera, and are further expansively applicable to repair facilitation to a function failure of another device, and are not limited to the present example illustrated as the compound eye camera.

Next, a sequence of temporary continuation of the automated driving control by the control system 1000 according to an embodiment will be described in detail. FIG. 8 is a flowchart illustrating the sequence of the temporary continuation of the automated driving control by the control system 1000 according to an embodiment. Note that FIG. 8 illustrates a flowchart that details the process of step S1105 in FIG. 7.

If the diagnosis unit 140 determines that the remaining function based on the image captured by one of the onboard cameras 115 is utilizable (step S1104: Yes in FIG. 7), the environment recognition unit 130 executes estimation for objects such as a road region and a forward vehicle based on the above image (S1201). As described above, the environment recognition unit 130 may estimate the road region on the basis of compartment lines or the like. Also, the environment recognition unit 130 may estimate the region that the forward vehicle has traveled, as the road region.

Also, in parallel with the process in step S1201, the control unit 210 causes a report that switching to the usual driving is performed, because a malfunction has occurred in the onboard camera 115, to be reported to the driver (S1202). Also, the control unit 210 causes a report that there is a possibility of urgent stop associated with the malfunction of the image capturing unit 110 to be reported to surrounding traveling vehicles (S1203).

Note that, in steps S1202 and S1203, the control unit 210 may cause the cause of the malfunction estimated by the diagnosis unit 140 to be reported to the driver and a third person such as a passenger of the surrounding traveling vehicle. In this case, the driver and the third person can perform an accident prevention action or the like for handling the cause of the malfunction. Also, when the vehicle is a share-ride bus, a commercial car operated and utilized by a large number of drivers in rotation, or the like, the malfunction comprehension and the repair management are adequately performed, and the harmful effect of vehicle utilization is made smallest even with the partial malfunction. Also, for the purpose of early repair management, the report of the malfunction event and the diagnosis information may be expanded further, by reporting to the operation business operator of the vehicle and its operation management device, the vehicle maintenance service administrator and its management device, the road utilization management system, or the like, and the target person of the report is needless to be limited to the driver and the surrounding road user.

Also, when the processes in steps S1201 to S1203 are completed one after another, the control unit 210 shifts to the temporary continuation control of the automated traveling that uses the remaining function of the image capturing unit 110 (S1204).

Upon shifting to the temporary continuation control of the automated traveling in step S1204, the control unit 210 executes control such as deceleration, ACC function, and LKAS function, on the basis of the road region, the forward vehicle, the obstacle, the road marker, and the like estimated in step S1201 (S1205).

Next, the driver recognition unit 220 calculates an estimated restart time, which is an index indicating the time until the driver stops the secondary task and restart the usual driving, on the basis of the state and the characteristics of the recognized driver (S1206).

Also, the control unit 210 calculates an allowable restart time, which is an index indicating an allowable time for the driver to restart the driving, on the basis of the surrounding environment estimated by the environment recognition unit 130 (S1207). Here, the control unit 210 can dynamically calculate the allowable restart time, on the basis of the congestion degree of the road traveling and the severity degree of the malfunction that occurs in the image capturing unit 110, for example. For example, urgent short-term takeover is unnecessary during the traveling in the road zone of significantly small traffic amount and traveling alone in the zone that is determined as a clear path over there, but at a situation such as immediately before the host vehicle proceeds into the winding road in which the road marker is worn off and the boundary determination is difficult, urgently pulling over may be controlled with priority even if the host vehicle is urgently pulled over and interferes the traveling of the surrounding traveling vehicles.

Subsequently, the control unit 210 determines whether or not the driving restart can be performed by the driver within the allowable restart time calculated in step S1207, or whether or not the driving restart has been performed by the driver within the allowable restart time (S1208).

Here, if the estimated restart time calculated in step S1206 exceeds the allowable restart time, or the allowable restart time has elapsed (S1208: No), the control unit 210 determines that the driving restart by the driver is difficult, and supplies a report of performing urgent deceleration and stop to the driver and the surrounding traveling vehicles, and thereafter decelerates the vehicle, and pulls over at a safe site (S1210).

On the other hand, if the driving restart by the driver is completed within the allowable time, the control unit 210 may execute a driving support function for supporting the driving by the driver, on the basis of the surrounding environment estimated from the image captured by the onboard camera 115 in which a malfunction is not detected (S1209). Here, the above driving function support includes warning relevant to deviation of compartment lines, warning relevant to forward vehicle distance, marker recognition, and the like, for example. According to the above function of the control unit 210 according to an embodiment, the driver can be supported at the maximum by using the remaining function, even when a malfunction occurs in one of the onboard cameras 115.

In the above, the sequence of the short-term temporary continuation of the automated driving control by the control system 1000 according to an embodiment has been described. That is, the detail described above is the utilization as the dealing function at the time of emergency in which the malfunction occurs during utilization. On the other hand, when more medium-term utilization of the vehicle according to an embodiment is assumed, the compound eye camera itself is not necessarily a requisite function for traveling of the vehicle and is not a fatal malfunction in the safety aspect, and thus it is also envisaged that the utilization is conducted in the malfunction state until repair is performed to the function malfunction of the compound eye camera. A sequence of the operation of the control system 1000 at the time of operation start of the vehicle system in that case will be described.

When the malfunction occurs in the compound eye camera 10, the function relevant to the recognition of the surrounding environment is restricted, and thus it is desirable that the compound eye camera 10 is repaired as early as possible. However, when a part of the driving support function is utilizable, or when there is no trouble in usual driving, it is also envisaged that the user forgets the malfunction that occurs in the compound eye camera 10.

Also, when the same vehicle is shared by a family, when a plurality of employee use the same vehicle in a corporation, or in the like cases, it is possible that a driver who does not know the occurrence of malfunction tries to utilize the automated driving function.

Hence, the control system 1000 according to an embodiment has a feature of causing a report regarding the repair request of the compound eye camera 10 to be reported to the driver and the fellow passengers at the time of operation start of the vehicle, until the malfunction of the compound eye camera 10 is improved by the repair. Here, the control unit 210 according to an embodiment may control not to turn off the above report, until the repair is performed.

The above function of the control unit 210 according to an embodiment can report that the malfunction occurs in the compound eye camera 10, to all drivers, even when a plurality of drivers share the vehicle. Also, the above function of the control unit 210 can request the repair repeatedly at the time of the operation start of the vehicle at least, and can effectively prompt early repair of the malfunction.

FIG. 9 is a flowchart illustrating the sequence of the operation of the control system 1000 at the time of operation start of the vehicle according to an embodiment.

Referring to FIG. 9, when the vehicle is started, first, the diagnosis unit 140 acquires a failure log and a log relevant to repair (S1301).

Also, the diagnosis unit 140 executes malfunction monitoring for the image capturing unit 110, similarly to during traveling (S1302).

Here, if the diagnosis unit 140 is unable to detect a malfunction relevant to the compound eye camera 10 from the log acquired in step S1301 and the malfunction monitoring in step S1302 (S1303: No), the control unit 210 may permit an automated driving mode (S1308).

On the other hand, if the malfunction relevant to the compound eye camera 10 is detected from the log acquired in step S1301 and the malfunction monitoring in step S1302 (S1303: Yes), the diagnosis unit 140 subsequently determines presence or absence of the onboard camera 115 that operates normally and the utilizable remaining function (S1304).

Here, if the diagnosis unit 140 determines that there is the utilizable remaining function on the basis of the image captured by the onboard camera 115 that operates normally (S1305: Yes), the control unit 210 may permit the driving support mode that uses the remaining function (S1306).

On the other hand, if the diagnosis unit 140 determines that there is no utilizable remaining function on the basis of the image captured by the onboard camera 115 that operates normally (S1305: No), the control unit 210 permits only the usual driving mode (S1307).

Also, after completing the process in step S1306 or S1307, the control unit 210 causes a report regarding a repair request of the malfunction that occurs in the compound eye camera 10 to be reported to the driver and the external device (S1309). Here, the above external device may include a terminal carried by the driver or the fellow passenger, a system managed by a dealer of the vehicle, or the like. Further, an incomplete system is continuously utilized in the public environment, and thus a scheme for performing situation delivery of the host vehicle to all road users that suffer the influence may be provided, and status delivery of the host vehicle by utilizing visual information, audio information, wireless information, or the like may be performed.

2. Hardware Configuration Example

Next, a hardware configuration example of the control system 1000 according to an embodiment of the present disclosure will be described. FIG. 10 is a block diagram illustrating the hardware configuration example of the control system according to an embodiment of the present disclosure. Referring to FIG. 10, the control system 1000 according to an embodiment of the present disclosure includes an ECU 900, a stereo camera 905, a surrounding environment acquisition unit 910, a sensor 915, a microphone 920, a communication device 925, a GNSS receiver 930, a speaker 935, a display 940, a lamp 945, an engine actuator 950, a direction indicator 955, a brake 960, a steering 965, and an accelerator 970.

(ECU 900)

The ECU 900 corresponds to the control device 20 described in embodiments. The ECU 900 generates a control signal relevant to driving control, on the basis of various input information, and controls a control target.

(Stereo Camera 905)

The stereo camera 905 corresponds to the compound eye camera 10 described in embodiments. The stereo camera 905 generates a disparity map on the basis of the image captured by two cameras, and recognizes the surrounding environment threedimensionally.

(Surrounding Environment Acquisition Unit 910)

The surrounding environment acquisition unit 910 is a device that recognizes the surrounding environment on the basis of the data other than the captured image. The surrounding environment acquisition unit 910 includes a sonar 911, a radar 912, and a Lidar 913, for example.

(Sensor 915)

The sensor 915 is a device that senses various data relevant to the surrounding environment and the vehicle. The sensor 915 includes an optical sensor, a heat sensor, a humidity sensor, an acceleration sensor, an angular velocity sensor, a geomagnetic sensor, a pressure sensor, a friction sensor, and the like, for example.

(Microphone 920)

The microphone 920 is a device that collects sound information generated inside and outside the vehicle.

(Communication Device 925)

The communication device 925 is a device that performs wireless communication with external devices. The communication device 925 may perform communication compliant with the standard set by the international telecommunication union, for example. Also, the communication device 925 may perform wireless communication that uses technologies such as dedicated short range communications (DSRC), Bluetooth (registered trademark), and Beacon.

(GNSS Receiver 930)

The GNSS receiver 930 is a device that receives radio wave transmitted from a global navigation satellite system (GNSS).

(Speaker 935)

The speaker 935 is a device that reports sound information on the basis of the control by the ECU 900. The speaker 935 outputs a report regarding a failure that occurs in the stereo camera 905, with sound, for example.

(Display 940)

The display 940 is a device that reports visual information, on the basis of the control by the ECU 900. The display 940 displays a report regarding the failure that occurs in the stereo camera 905, with a text and an image, for example.

(Lamp 945)

The lamp 945 is various devices that emit light on the basis of the control by the ECU 900. The lamp 945 includes a warning light or the like included inside and outside the vehicle, in addition to the headlight and the taillight.

(Engine Actuator 950)

The engine actuator 950 is a device that supplies power to the engine on the basis of the control by the ECU 900.

(Direction Indicator 955)

The direction indicator 955 is a device that indicates the forward direction of the vehicle to others, on the basis of the control by the ECU 900.

(Brake 960)

The brake 960 is a device for decelerating the vehicle. The brake 960 sends, to the ECU 900, the depression amount or the like of the pedal operated by the driver. Also, the brake actuator 961 supplies power to the brake 960, on the basis of the control by the ECU 900.

(Steering 965)

The steering 965 is a device for deciding the forward direction of the vehicle. The steering 965 sends, to the ECU 900, the direction, degree, etc. of steering by the driver. Also, the steering actuator 966 supplies power to the steering 965, on the basis of the control by the ECU 900.

(Accelerator 970)

The accelerator 970 is a device for controlling the speed of the vehicle. The accelerator 970 sends, to the ECU 900, the depression amount or the like of the pedal operated by the driver.

In the above, the hardware configuration example of the control system 1000 according to an embodiment of the present disclosure has been described. Note that the above configuration described by using FIG. 10 is just an example, and the hardware configuration of the control system 1000 is not limited to such an example, and can be changed flexibly.

3. Conclusion

As described above, the control device 20 according to an embodiment of the present disclosure has a feature of temporarily continuing the automated traveling of the vehicle, on the basis of the surrounding environment estimated by the remaining function of the compound eye camera, when the malfunction of the compound eye camera used in the recognition of the surrounding environment is detected during the execution of the automated driving control for the vehicle. With this configuration, safer vehicle control is performed even when a failure occurs in the compound eye camera.

It should be understood by those skilled in the art that various modifications, combinations, sub-combinations and alterations may occur depending on design requirements and other factors insofar as they are within the scope of the appended claims or the equivalents thereof.

For example, in the above embodiments, a case in which the control device 20 mainly performs control relevant to the automated driving of the vehicle has been described as a main example, but the present technology is not limited to this example. The control device 20 can control various devices that perform autonomous movement, such as movement of a robot, for example.

Moreover, for example, in the above embodiments, a case in which the control device 20 performs the driving control by using the remaining function of the onboard camera that operates normally, among the onboard cameras included in the compound eye camera 10 utilized in the automated driving mainly, has been described for example, but the present technical idea is not limited to the stereo camera but is also applicable to various surrounding environment recognition units, such as a shortdistance or long-distance millimeter wave radar and sonar, a multifocal multiple-eye camera system, and Lidar.

Further, the effects described in this specification are merely illustrative or exemplified effects, and are not limitative. That is, with or in the place of the above effects, the technology according to the present disclosure may achieve other effects that are clear to those skilled in the art from the description of this specification.

Also, each step relevant to the process of the control system 1000 of the present specification is needless to be performed in temporal sequence along the order described in the flowchart necessarily. For example, each step relevant to the process of the control system 1000 may be processed in an order that differs from the order described in the flowchart, and may be processed in parallel.

Additionally, the present technology may also be configured as below.

(1)

A control device including:

circuitry configured to:

perform driving control of a vehicle; and continue, when an abnormality of a first function of a compound eye camera used in a recognition of a surrounding environment is detected during execution of automated driving control for the vehicle, automated traveling of the vehicle on a basis of the surrounding environment estimated by a second function of the compound eye camera.

(2)

The control device according to (1), wherein the compound eye camera is a stereo camera that includes a first camera and a second camera, and when the abnormality is detected in one of the first camera and the second camera, the control unit continues the automated traveling of the vehicle, on a basis of the surrounding environment estimated from an image captured by the other camera in which the abnormality is not detected.

(3)

The control device according to (1) or (2), wherein the circuitry is further configured to continue the automated traveling of the vehicle, on a basis of a road region estimated from the image captured by the other camera in which the abnormality is not detected.

(4)

The control device according to any of (1) to (3), wherein the road region is estimated on a basis of a compartment line included in the image captured by the other camera in which the abnormality is not detected, and the circuitry is further configured to cause the vehicle to perform the automated traveling in the road region, so as not to deviate from the compartment line.

(5)

The control device according to any of (1) to (4), wherein the circuitry is further configured to continue the automated traveling of the vehicle on a basis of a position of a forward vehicle estimated from the image captured by the other camera in which the abnormality is not detected.

(6)

The control device according to any of (1) to (5), wherein the circuitry is further configured to continue the automated traveling of the vehicle, so as to follow the forward vehicle, on a basis of an estimated distance to the forward vehicle.

(7)
The control device according to any of (1) to (6), wherein the circuitry is further configured to continue the automated traveling of the vehicle, until a driving restart by a driver is detected.

(8)
The control device according to any of (1) to (7), wherein the circuitry is further configured to execute a control to stop the vehicle, when the driving restart cannot be performed by the driver within a predetermined period of time.

(9)
The control device according to any of (1) to (8), wherein the circuitry is further configured to execute a control to stop the vehicle, when an estimated restart time of the driver exceeds a predetermined period of time.

(10)
The control device according to any of (1) to (9), wherein the circuitry is further configured to execute a vehicle function on a basis of the surrounding environment estimated from an image captured by the other camera in which the abnormality is not detected, after the driving restart by the driver is completed.

(11)
The control device according to any of (1) to (10), wherein the circuitry is further configured to execute at least one of warning relevant to deviation from a compartment line, warning relevant to a forward vehicle distance, or marker recognition, after the driving restart by the driver is completed.

(12)
The control device according to any of (1) to (11), wherein the circuitry is further configured to cause a report regarding a repair request of the compound eye camera to be reported to a driver, in the case where the abnormality of the compound eye camera is detected.

(13)
The control device according to any of (1) to (12), wherein the circuitry is further configured to cause the report regarding the repair request of the compound eye camera to be reported to the driver at a time of an operation start of the vehicle, until the compound eye camera becomes fully operational, and causes a log regarding the report to be recorded.

(14)
The control device according to any of (1) to (13), wherein the circuitry is further configured to cause an estimated cause of the abnormality to be reported to at least one of a driver or another person, in the case where the abnormality of the compound eye camera is detected.

(15)
The control device according to any of (1) to (14), wherein the circuitry is further configured to execute a control to stop the vehicle, when abnormalities are detected in both of the first camera and the second camera.

(16)
A control system including:
a control device including circuitry configured to perform driving control of a vehicle; and
a compound eye camera that captures an image around the vehicle and recognizes a surrounding environment,
wherein the circuitry is further configured to continue, when an abnormality of a first function of the compound eye camera is detected during execution of automated driving control for the vehicle, automated traveling of the vehicle, on a basis of the surrounding environment estimated by a second function of the compound eye camera.

(17)
A method including:
performing control of a vehicle; and
continuing, when an abnormality of a first function of a compound eye camera used in a recognition of a surrounding environment is detected during execution of automated driving control for the vehicle, automated traveling of the vehicle on a basis of the surrounding environment estimated by a second function of the compound eye camera.

(18)
A non-transitory computer-readable storage medium having embodied thereon a program, which when executed by a computer causes the computer to execute a method, the method including:
performing control of a vehicle; and
continuing, when an abnormality of a first function of a compound eye camera used in a recognition of a surrounding environment is detected during execution of automated driving control for the vehicle, automated traveling of the vehicle on a basis of the surrounding environment estimated by a second function of the compound eye camera.

(19)
A control device including:
a control unit that performs driving control of a vehicle,
in which the control unit temporarily continues automated traveling of the vehicle on a basis of a surrounding environment estimated by a remaining function of a compound eye camera, in a case where a malfunction of the compound eye camera used in recognition of the surrounding environment is detected during execution of automated driving control for the vehicle.

(20)
The control device according to (19), in which
the compound eye camera is a stereo camera that includes a first onboard camera and a second onboard camera, and
in a case where a malfunction is detected in one of the first onboard camera and the second onboard camera, the control unit temporarily continues the automated traveling of the vehicle, on a basis of the surrounding environment estimated from an image captured by the other onboard camera in which a malfunction is not detected.

(21)
The control device according to (20), in which
the control unit temporarily continues the automated traveling of the vehicle, on a basis of a road region estimated from the image captured by the other onboard camera in which the malfunction is not detected.

(22)
The control device according to (21), in which
the road region is estimated on a basis of a compartment line included in the image captured by the other onboard camera in which the malfunction is not detected, and the control unit causes the vehicle to temporarily perform the automated traveling in the road region, so as not to deviate from the compartment line.

(23)
The control device according to any one of (20) to (22), in which
the control unit temporarily continues the automated traveling of the vehicle on a basis of a position of a forward vehicle estimated from the image captured by the other onboard camera in which the malfunction is not detected.

(24)
The control device according to (23), in which
the control unit temporarily continues the automated traveling of the vehicle, so as to follow the forward vehicle, on a basis of an estimated distance to the forward vehicle.

(25)

The control device according to any one of (19) to (24), in which
the control unit temporarily continues the automated traveling of the vehicle, until a driving restart by a driver is detected.

(26)

The control device according to (25), in which
the control unit executes safety stop control of the vehicle, in a case where the driving restart by the driver is difficult within an allowable restart time.

(27)

The control device according to (25) or (26), in which
the control unit executes safety stop control of the vehicle, in a case where an estimated restart time of the driver exceeds an allowable restart time.

(28)

The control device according to any one of (25) to (27), in which
the control unit executes a driving support function on a basis of the surrounding environment estimated from an image captured by the other onboard camera in which a malfunction is not detected, after the driving restart by the driver is completed.

(29)

The control device according to (28), in which
the control unit executes at least one of warning relevant to deviation from a compartment line, warning relevant to a forward vehicle distance, or marker recognition, after the driving restart by the driver is completed.

(30)

The control device according to any one of (19) to (29), in which
the control unit causes a report regarding a repair request of the compound eye camera to be reported to a driver, in the case where the malfunction of the compound eye camera is detected.

(31)

The control device according to (30), in which
the control unit causes the report regarding the repair request of the compound eye camera to be reported to the driver at a time of an operation start of the vehicle, until the malfunction of the compound eye camera is improved, and causes a log regarding the report to be recorded.

(32)

The control device according to any one of (19) to (31), in which
the control unit causes an estimated cause of the malfunction to be reported to at least one of a driver or a third person, in the case where the malfunction of the compound eye camera is detected.

(33)

The control device according to any one of (20) to (24), in which
the control unit executes safety stop control of the vehicle, in a case where malfunctions are detected in both of the first onboard camera and the second onboard camera.

(34)

A control system including:
a control device that performs driving control of a vehicle; and
a compound eye camera that captures an image around the vehicle and recognizes a surrounding environment,
in which the control device temporarily continues automated traveling of the vehicle, on a basis of the surrounding environment estimated by a remaining function of the compound eye camera, in a case where a malfunction of the compound eye camera is detected during execution of automated driving control for the vehicle.

REFERENCE SIGNS LIST 1000 control system
10 compound eye camera
110 image capturing unit
115 onboard camera
120 map generation unit
130 environment recognition unit
140 diagnosis unit
150 communication unit
20 control device
210 control unit
220 driver recognition unit
230 learning unit
240 communication unit
30 control target device

The invention claimed is:

1. A control device comprising:
circuitry configured to:
perform automated driving control of a vehicle using a compound eye camera including a first camera and a second camera to recognize a surrounding environment based on generating a disparity map that contains three-dimensional information;
detect a malfunction of the first camera; and
continue automated driving control of the vehicle after detecting the malfunction using only the second camera to recognize the surrounding environment based on analysis of compartment lines in a single image of a road captured only by the second camera in which the malfunction is not detected and based on a calibrated vanishing point determined from images previously obtained by the first camera and the second camera.

2. The control device according to claim 1, wherein the circuitry is further configured to continue the automated driving control of the vehicle, on a basis of a road region estimated from the image captured by the second camera in which the malfunction is not detected.

3. The control device according to claim 2, wherein the road region is estimated on a basis of a compartment line included in the image captured by the second camera in which the malfunction is not detected, and the circuitry is further configured to cause the vehicle to perform the automated driving control in the road region, so as not to deviate from the compartment line.

4. The control device according to claim 1, wherein the circuitry is further configured to continue the automated driving control of the vehicle on a basis of a position of a forward vehicle estimated from the image captured by the second camera in which the malfunction is not detected.

5. The control device according to claim 4, wherein the circuitry is further configured to continue the automated driving control of the vehicle, so as to follow the forward vehicle, on a basis of an estimated distance to the forward vehicle.

6. The control device according to claim 1, wherein the circuitry is further configured to continue the automated driving control of the vehicle, until a driving restart by a driver is detected.

7. The control device according to claim 6, wherein the circuitry is further configured to execute a control to stop the vehicle, when the driving restart cannot be performed by the driver within a predetermined period of time.

8. The control device according to claim 6, wherein the circuitry is further configured to execute a control to stop the vehicle, when an estimated restart time that the driver starts driving exceeds a predetermined period of time.

9. The control device according to claim 6, wherein the circuitry is further configured to execute a vehicle function on a basis of the surrounding environment estimated from an image captured by the second camera in which the malfunction is not detected, after the driving restart by the driver is completed.

10. The control device according to claim 9, wherein the circuitry is further configured to execute at least one of warning relevant to deviation from a compartment line, warning relevant to a distance to a second vehicle in a forward direction, or marker recognition, after the driving restart by the driver is completed.

11. The control device according to claim 1, wherein the circuitry is further configured to cause a report regarding a repair request of the first camera to be reported to a driver, in the case where the malfunction of the first camera is detected.

12. The control device according to claim 11, wherein the circuitry is further configured to cause the report regarding the repair request of the first camera to be reported to the driver at a time of an operation start of the vehicle, until the first camera becomes fully operational, and causes a log regarding the report to be recorded.

13. The control device according to claim 1, wherein the circuitry is further configured to cause an estimated cause of the malfunction to be reported to at least one of a driver or another person, in the case where the malfunction of the first camera is detected.

14. The control device according to claim 1, wherein the circuitry is further configured to execute a control to stop the vehicle, when malfunctions are detected in both of the first camera and the second camera.

15. A method executed by circuitry, the method comprising:
performing automated driving control of a vehicle using a compound eye camera including a first camera and a second camera to recognize a surrounding environment based on generating a disparity map that contains three-dimensional information;
detecting a malfunction of the first camera; and
continuing automated driving control of the vehicle after detecting the malfunction using only the second camera to recognize the surrounding environment based on analysis of compartment lines in a single image of a road captured only by the second camera in which the malfunction is not detected and based on a calibrated vanishing point determined from images previously obtained by the first camera and the second camera.

16. A non-transitory computer-readable storage medium having embodied thereon a program which, when executed by a computer causes the computer to execute a method comprising:
performing automated driving control of a vehicle using a compound eye camera including a first camera and a second camera to recognize a surrounding environment based on generating a disparity map that contains three-dimensional information;
detecting a malfunction of the first camera; and
continuing automated driving control of the vehicle after detecting the malfunction using only the second camera to recognize the surrounding environment based on analysis of compartment lines in a single image of a road captured only by the second camera in which the malfunction is not detected and based on a calibrated vanishing point determined from images previously obtained by the first camera and the second camera.

17. A control system comprising:
a compound eye camera including a first camera and a second camera; and
a control device comprising circuitry configured to:
perform automated driving control of a vehicle using a compound eye camera including the first camera and the second camera to recognize a surrounding environment based on generating a disparity map that contains three-dimensional information;
detect a malfunction of the first camera; and
continue automated driving control of the vehicle after detecting the malfunction using only the second camera to recognize the surrounding environment based on analysis of compartment lines in a single image of a road captured only by the second camera in which the malfunction is not detected and based on a calibrated vanishing point determined from images previously obtained by the first camera and the second camera.

* * * * *